United States Patent
Hsu et al.

(10) Patent No.: US 12,512,134 B2
(45) Date of Patent: Dec. 30, 2025

(54) NONVOLATILE MEMORY WITH ONGOING PROGRAM READ

(71) Applicant: Sandisk Technologies, Inc., Milpitas, CA (US)

(72) Inventors: Hua-Ling Cynthia Hsu, Fremont, CA (US); Victor Avila, San Jose, CA (US); Henry Chin, Fremont, CA (US)

(73) Assignee: Sandisk Technologies, Inc., Milpitas, CA (US)

(*) Notice: Subject to any disclaimer, the term of this patent is extended or adjusted under 35 U.S.C. 154(b) by 207 days.

(21) Appl. No.: 18/360,273

(22) Filed: Jul. 27, 2023

(65) Prior Publication Data
US 2024/0221803 A1 Jul. 4, 2024

Related U.S. Application Data

(60) Provisional application No. 63/436,727, filed on Jan. 3, 2023.

(51) Int. Cl.
*G11C 7/10* (2006.01)

(52) U.S. Cl.
CPC ............ *G11C 7/1096* (2013.01); *G11C 7/106* (2013.01); *G11C 7/1069* (2013.01)

(58) Field of Classification Search
CPC ..... G11C 7/1096; G11C 7/106; G11C 7/1069; G11C 16/0483; G11C 16/10; G11C 16/3459; G11C 11/5628
USPC ..................................... 365/189.011, 230.06
See application file for complete search history.

(56) References Cited

U.S. PATENT DOCUMENTS

| | | | | |
|---|---|---|---|---|
| 9,530,491 B1* | 12/2016 | Uttarwar | ............ | G11C 11/5628 |
| 9,570,159 B1* | 2/2017 | Wakchaure | ......... | G11C 11/4096 |
| 10,650,896 B1 | 5/2020 | Yang | | |
| 10,872,671 B1* | 12/2020 | Vishwanath | ........... | G11C 29/52 |
| 11,133,068 B2 | 9/2021 | Na | | |
| 11,139,007 B2 | 10/2021 | Sato et al. | | |
| 2003/0218901 A1* | 11/2003 | Ooishi | ................ | G11C 11/1673 365/157 |
| 2008/0158980 A1* | 7/2008 | Kamei | ................ | G11C 11/5628 365/185.19 |
| 2009/0225596 A1* | 9/2009 | Shin | ..................... | G11C 11/5642 365/230.06 |
| 2014/0292688 A1* | 10/2014 | Munechika | ......... | G06F 3/04184 345/173 |
| 2016/0093385 A1* | 3/2016 | Guenther | ............... | G11C 16/28 365/185.05 |
| 2017/0109093 A1* | 4/2017 | Chu | .................... | G06F 9/30018 |

(Continued)

*Primary Examiner* — Michael T Tran
(74) *Attorney, Agent, or Firm* — Pearl Cohen Zedek Latzer Baratz LLP

(57) ABSTRACT

An apparatus includes control circuits configured to connect to a plurality of non-volatile memory cells. The control circuits are configured to receive a read command directed to at least one logical page of data during a program operation to store the at least one logical page of data in a plurality of non-volatile memory cells. The control circuits are further configured to stop the program operation at an intermediate stage of programming, read the plurality of non-volatile memory cells at the intermediate stage to obtain first partial data of at least one logical page and obtain the at least one logical page of data by combining the first partial data with second partial data of the at least one logical page stored in data latches.

20 Claims, 24 Drawing Sheets

(56) References Cited

U.S. PATENT DOCUMENTS

| | | |
|---|---|---|
| 2020/0303000 A1* | 9/2020 | Takahashi .............. G11C 16/10 |
| 2021/0286731 A1 | 9/2021 | Alhussien et al. |
| 2022/0005816 A1 | 1/2022 | Yamaguchi |
| 2022/0392555 A1* | 12/2022 | Mizukoshi ......... G11C 16/3481 |

* cited by examiner

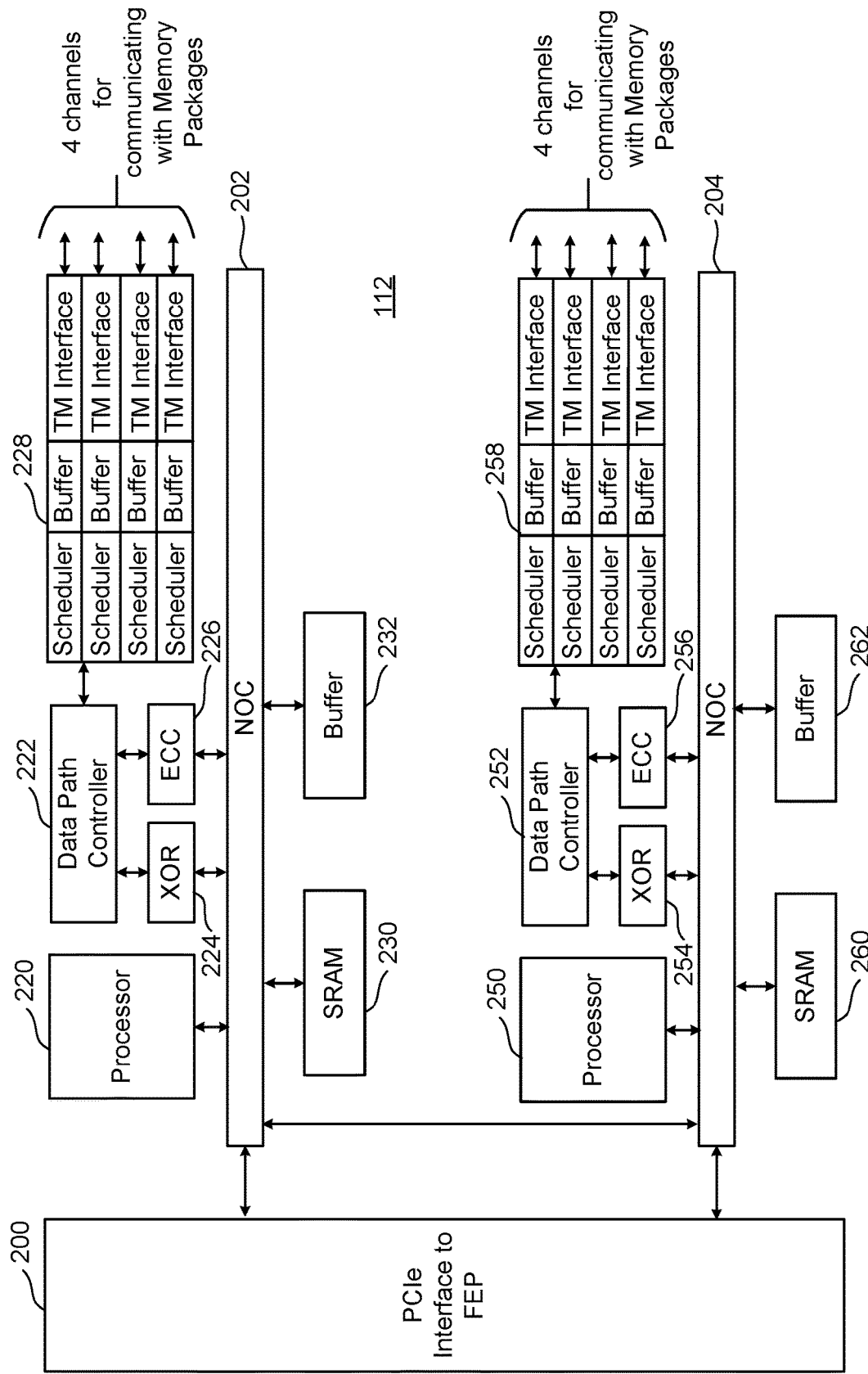

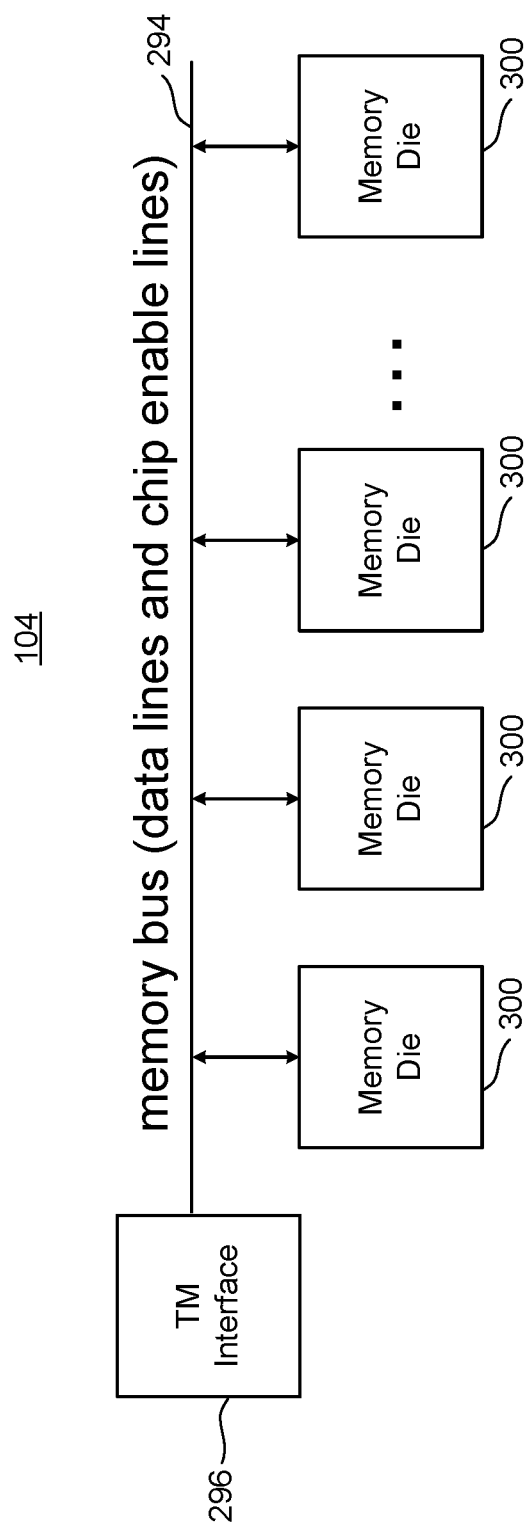

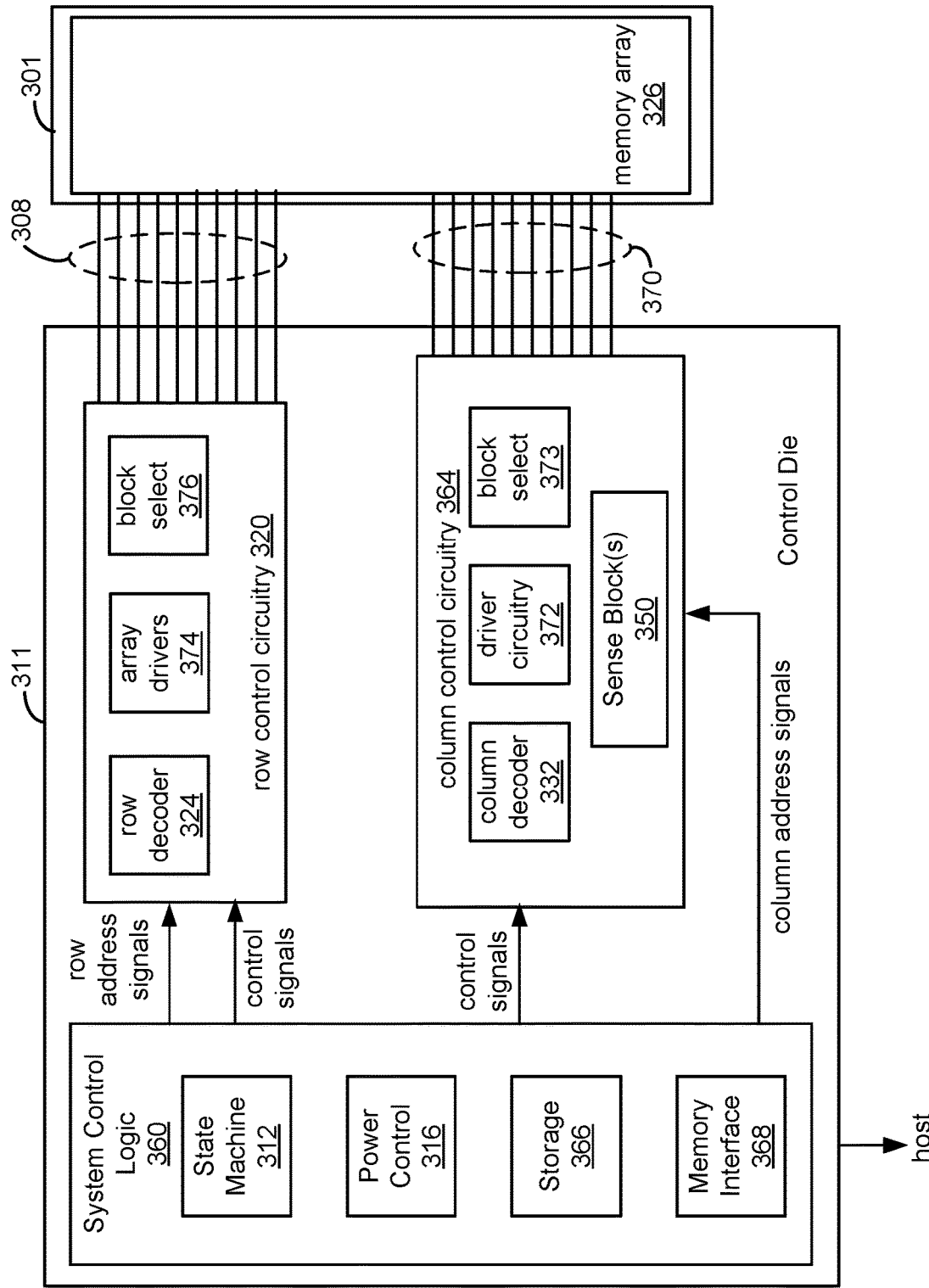

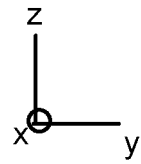
Fig. 4C
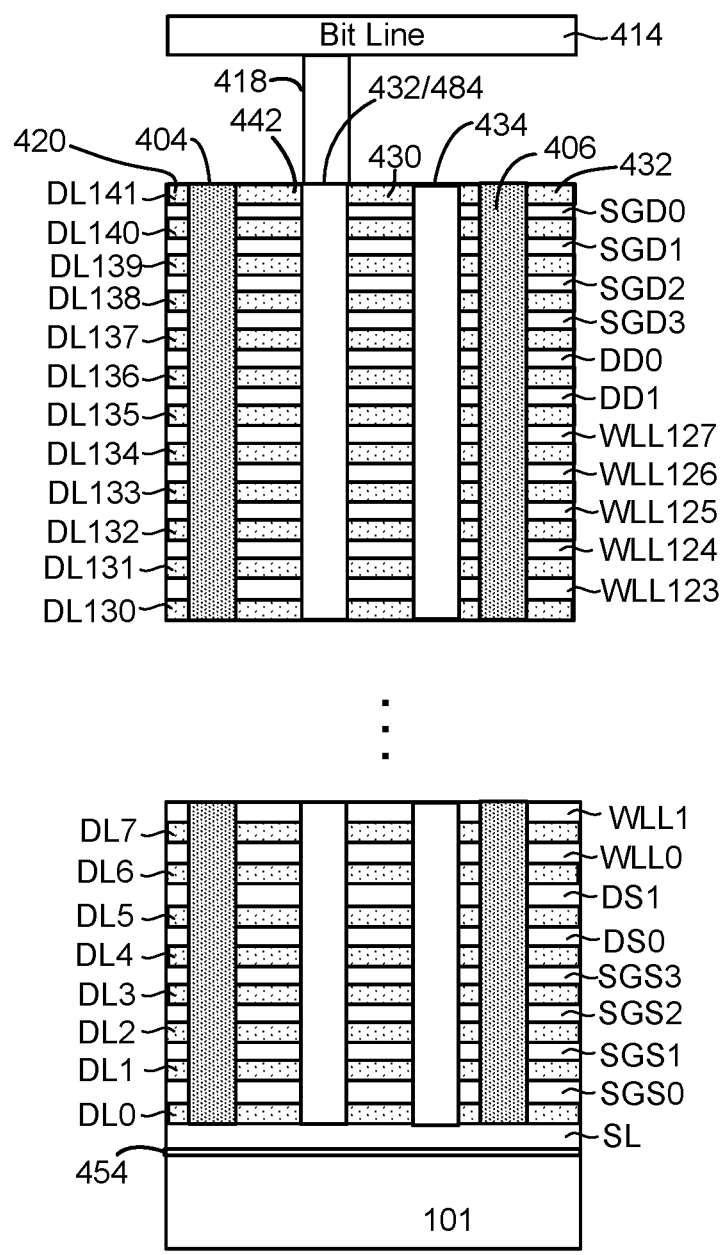

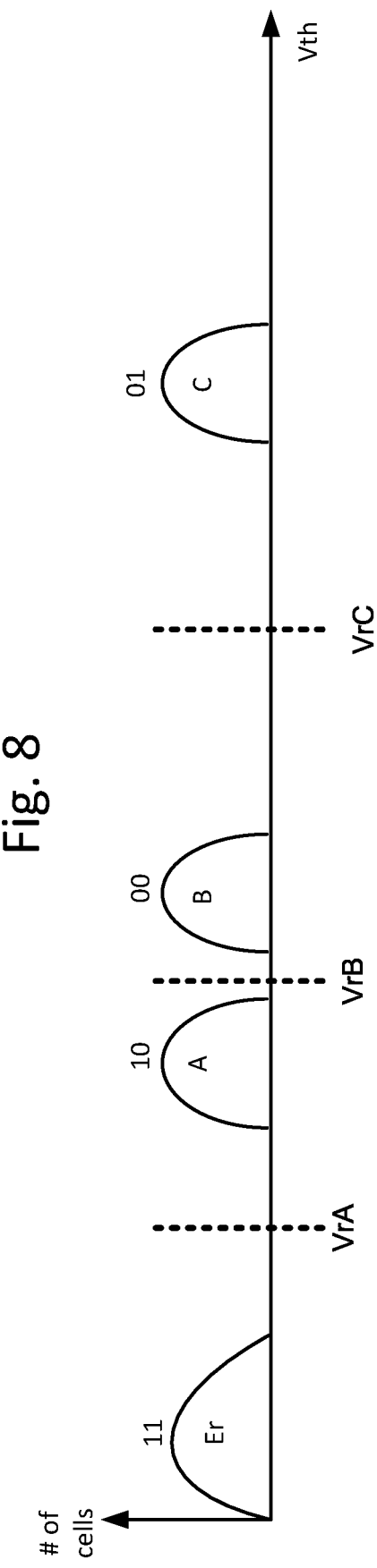

Fig. 16A

| | S0 | S1 | S2 | S3 | S4 | S5 | S6 | S7 | S8 | S9 | S10 | S11 | S12 | S13 | S14 | S15 |
|---|---|---|---|---|---|---|---|---|---|---|---|---|---|---|---|---|
| ADL | 1 | 1 | 1 | 1 | 1 | 0 | 0 | 0 | 0 | 0 | 0 | 1 | 1 | 1 | 0 | 0 |
| BDL | 1 | 1 | 1 | 1 | 0 | 0 | 1 | 1 | 1 | 0 | 0 | 0 | 0 | 0 | 0 | 1 |
| CDL | 1 | 1 | 0 | 0 | 0 | 0 | 0 | 0 | 1 | 1 | 0 | 0 | 1 | 1 | 1 | 1 |
| TDL | 1 | 0 | 0 | 1 | 1 | 1 | 1 | 0 | 0 | 0 | 0 | 0 | 0 | 1 | 1 | 1 |

Fig. 16B

| | S0 | S1 | S2 | S3 | S4 | S5 | S6 | S7 | S8 | S9 | S10 | S11 | S12 | S13 | S14 | S15 |
|---|---|---|---|---|---|---|---|---|---|---|---|---|---|---|---|---|
| XDL | 0 | 0 | 0 | 0 | 0 | 0 | 0 | 0 | 1 | 1 | 1 | 1 | 1 | 1 | 1 | 1 |
| ADL | 1 | 1 | 1 | 1 | 0 | 0 | 0 | 0 | 0 | 0 | 0 | 0 | 1 | 1 | 1 | 1 |
| BDL | 1 | 0 | 0 | 1 | 1 | 1 | 0 | 0 | 0 | 1 | 1 | 0 | 1 | 0 | 0 | 1 |
| CDL | 1 | 1 | 0 | 0 | 1 | 0 | 1 | 0 | 1 | 1 | 0 | 0 | 0 | 0 | 1 | 1 |
| TDL (QPW) | 1 | 0 | 0 | 0 | 0 | 0 | 0 | 0 | 0 | 0 | 0 | 0 | 0 | 0 | 0 | 0 |

… # NONVOLATILE MEMORY WITH ONGOING PROGRAM READ

CLAIM OF PRIORITY

The present application claims priority from U.S. Provisional Patent Application No. 63/436,727, entitled "NONVOLATILE MEMORY WITH ONGOING PROGRAM READ," by Hsu et al., filed Jan. 3, 2023, incorporated by reference herein in its entirety.

BACKGROUND

Semiconductor memory is widely used in various electronic devices such as cellular telephones, digital cameras, personal digital assistants, medical electronics, mobile computing devices, non-mobile computing devices and data servers. Semiconductor memory may comprise non-volatile memory or volatile memory. A non-volatile memory allows information to be stored and retained even when the non-volatile memory is not connected to a source of power (e.g., a battery). Examples of non-volatile memory include flash memory (e.g., NAND-type and NOR-type flash memory), Electrically Erasable Programmable Read-Only Memory (EEPROM), and others. Some memory cells store information by storing a charge in a charge storage region. Other memory cells store information using other techniques, such as by the resistance of the memory cell. Some memories store one bit per cell using two data states (Single Level Cell or SLC) while others store more than one bit per cell using more than two data states (Multi Level Cell or MLC, which may store two bits per cell). Storing four bits per cell may use sixteen data states may (Quad Level Cell or QLC).

When a memory system is deployed in or connected to an electronic device (the host), the memory system can be used to store data and read data. For example, data may be stored in response to a program (write) command. Data may be read in response to a read command that specifies the data to be read. In some cases, the data to be read may not yet be fully programmed when a read command is received (e.g., a program operation to program the data is ongoing).

BRIEF DESCRIPTION OF THE DRAWINGS

Like-numbered elements refer to common components in the different Figures.

FIG. 1C is a block diagram of one embodiment of a Back End Processor Circuit. In some embodiments, the Back End Processor Circuit is part of a Controller.

FIG. 1D is a block diagram of one embodiment of a memory package.

FIG. 2B is a functional block diagram of an embodiment of an integrated memory assembly.

FIG. 4C depicts a cross sectional view of a portion of a block of memory cells.

FIG. 8 shows an example of reading MLC data.

FIG. 9 shows an example of an encoding scheme.

FIGS. 16A-B show examples of state code and program code respectively.

DETAILED DESCRIPTION

Techniques are disclosed herein to enable a memory system to efficiently respond to a read command that is received while the data specified in the read command is being programmed (e.g., after programming is initiated and prior to completion, while programming is still ongoing). Programming may be stopped at an intermediate stage (e.g., with memory cells having threshold voltages that are not their target threshold voltages) and the non-volatile memory cells may be read to obtain first partial data (complete data may not be available from the non-volatile memory cells because programming is not complete at this point). Second partial data may be obtained from latches used to hold the data during programming (complete data may not be available from the latches at this point because latched data is changed as memory cells are verified as reaching target threshold voltage ranges). By combining the first partial data and the second partial data, a complete copy of the data may be obtained and may be returned in response to the read command. This may allow a rapid response to a read command (e.g., significantly faster than waiting to complete programming and then reading the data from the non-volatile memory cells). Subsequently, programming of the memory cells may be resumed and may fully program the memory cells to their target threshold voltage ranges.

In some cases, data is converted from state code to program code prior to programming so that the data in latches during programming is in the form of program code. Program code in latches may be converted back to state code prior to combining with data read from the memory cells. In memory systems that use Quick Pass Write (QPW) to control programming speeds (e.g., slow down programming of certain memory cells), QPW data (e.g., data identifying which cells to slow) may be sent to storage (e.g., in a storage location on a memory die, controller die or elsewhere) and may be sent back for use in a resumed program operation. Alternatively, QPW data can be newly-generated for the resumed program operation, for example, by performing additional verify steps to identify memory cells to be slowed.

Figure 1A:
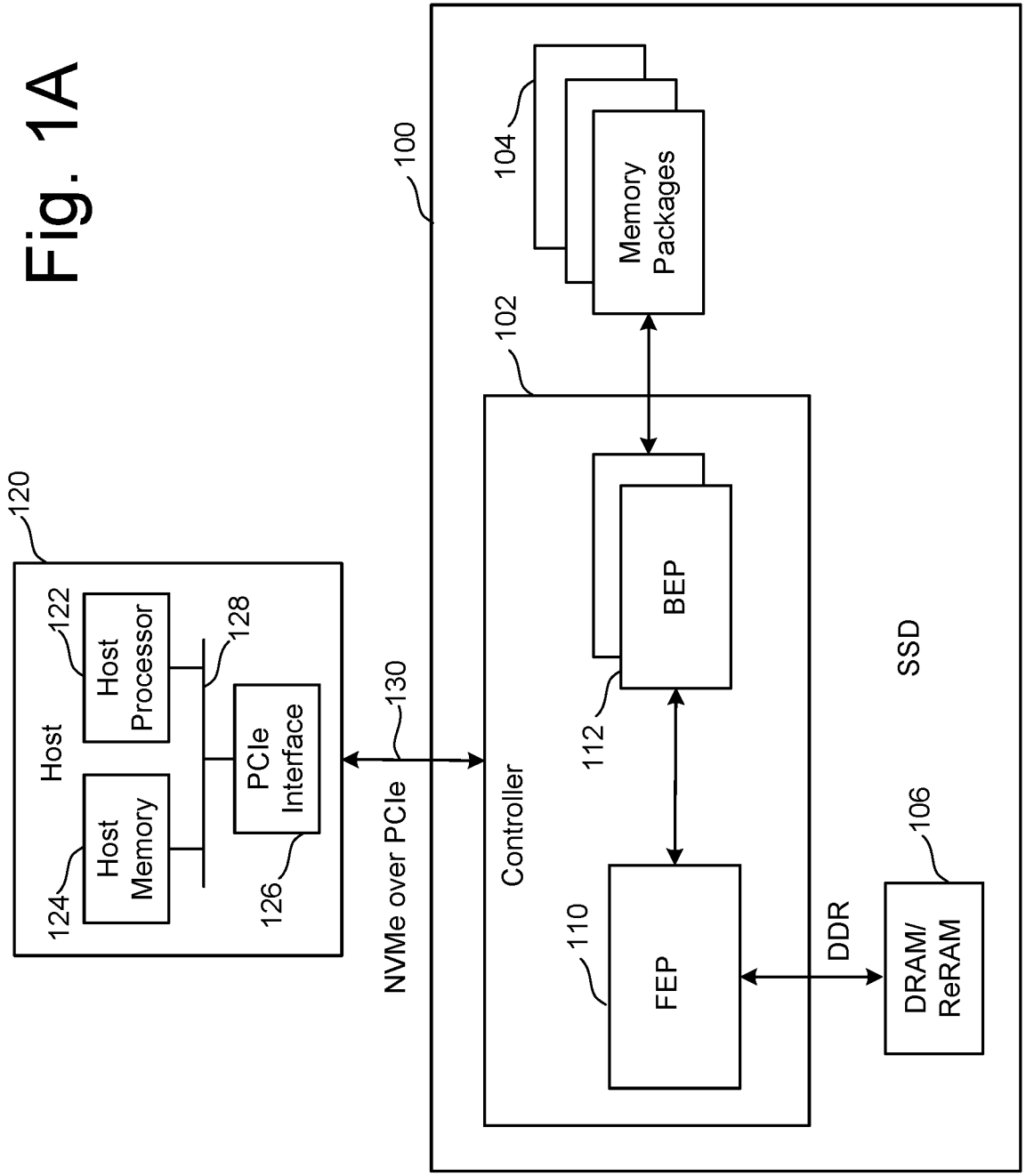
FIG. 1A is a block diagram of one embodiment of a memory system connected to a host.

FIG. 1A is a block diagram of one embodiment of a memory system 100 connected to a host 120. Memory system 100 can implement the technology proposed herein. Many different types of memory systems can be used with the technology proposed herein. One example memory system is a solid-state drive ("SSD"); however, other types of memory systems can also be used. Memory system 100 comprises a Controller 102, non-volatile memory 104 for storing data, and local memory (e.g., DRAM/ReRAM) 106. Controller 102 comprises a Front-End Processor Circuit (FEP) 110 and one or more Back End Processor Circuits (BEP) 112. In one embodiment FEP circuit 110 is implemented on an ASIC. In one embodiment, each BEP circuit 112 is implemented on a separate ASIC. The ASICs for each of the BEP circuits 112 and the FEP circuit 110 are implemented on the same semiconductor such that the Controller 102 is manufactured as a System on a Chip ("SoC"). FEP 110 and BEP 112 both include their own processors. In one embodiment, FEP circuit 110 and BEP 112 work as a master slave configuration where the FEP circuit 110 is the master and each BEP 112 is a slave. For example, FEP circuit 110 implements a flash translation layer that performs memory management (e.g., garbage collection, wear leveling, etc.), logical to physical address translation, communication with the host, management of DRAM (local volatile memory) and management of the overall operation of the SSD (or other non-volatile storage system). The BEP circuit 112 manages memory operations in the memory packages/die at the request of FEP circuit 110. For example, the BEP circuit 112 can carry out the read, erase and programming processes. Additionally, the BEP circuit 112 can perform buffer management, set specific voltage levels required by the FEP circuit 110, perform error correction (ECC), control the Toggle Mode interfaces to the memory packages, etc. In one embodiment, each BEP circuit 112 is responsible for its own set of memory packages. Controller 102 is one example of a control circuit.

In one embodiment, non-volatile memory 104 comprises a plurality of memory packages. Each memory package includes one or more memory die. Therefore, Controller 102 is connected to one or more non-volatile memory die. In one embodiment, each memory die in the memory packages 14 utilize NAND flash memory (including two-dimensional NAND flash memory and/or three-dimensional NAND flash memory). In other embodiments, the memory package can include other types of memory.

Controller 102 communicates with host 120 via an interface 130 that implements NVM Express (NVMe) over PCI Express (PCIe). For working with memory system 100, host 120 includes a host processor 122, host memory 124, and a PCIe interface 126 connected to bus 128. Host memory 124 is the host's physical memory, and can be DRAM, SRAM, non-volatile memory or another type of storage. Host 120 is external to and separate from memory system 100. In one embodiment, memory system 100 is embedded in host 120.

Figure 1B:
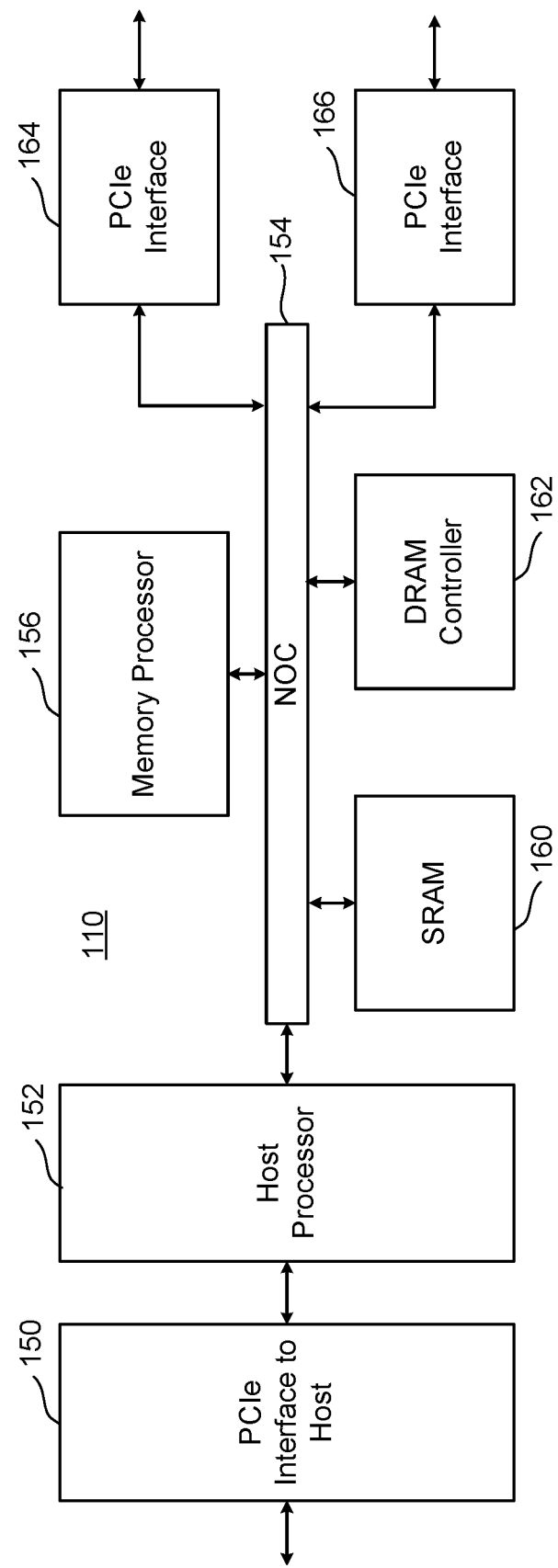
FIG. 1B is a block diagram of one embodiment of a Front-End Processor Circuit. In some embodiments, the Front-End Processor Circuit is part of a Controller.

FIG. 1B is a block diagram of one embodiment of FEP circuit 110. FIG. 1B shows a PCIe interface 150 to communicate with host 120 and a host processor 152 in communication with that PCIe interface. The host processor 152 can be any type of processor known in the art that is suitable for the implementation. Host processor 152 is in communication with a network-on-chip (NOC) 154. A NOC is a communication subsystem on an integrated circuit, typically between cores in a SoC. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of SoCs and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). Connected to and in communication with NOC 154 is the memory processor 156, SRAM 160 and a DRAM controller 162. The DRAM controller 162 is used to operate and communicate with the DRAM (e.g., DRAM 106). SRAM 160 is local RAM memory used by memory processor 156. Memory processor 156 is used to run the FEP circuit and perform the various memory operations. Also in communication with the NOC are two PCIe Interfaces 164 and 166. In the embodiment of FIG. 1B, the SSD controller will include two BEP circuits 112; therefore, there are two PCIe Interfaces 164/166. Each PCIe Interface communicates with one of the BEP circuits 112. In other embodiments, there can be more or less than two BEP circuits 112; therefore, there can be more than two PCIe Interfaces.

FIG. 1C is a block diagram of one embodiment of the BEP circuit 112. FIG. 1C shows a PCIe Interface 200 for communicating with the FEP circuit 110 (e.g., communicating with one of PCIe Interfaces 164 and 166 of FIG. 1B). PCIe Interface 200 is in communication with two NOCs 202 and 204. In one embodiment the two NOCs can be combined to one large NOC. Each NOC (202/204) is connected to SRAM (230/260), a buffer (232/262), processor (220/250), and a data path controller (222/252) via an XOR engine (224/254) and an ECC engine (226/256). The ECC engines 226/256 are used to perform error correction, as known in the art. The XOR engines 224/254 are used to XOR the data so that data can be combined and stored in a manner that can be recovered in case there is a programming error. Data path controller 22 is connected to an interface module for communicating via four channels with memory packages. Thus, the top NOC 202 is associated with an interface 228 for four channels for communicating with memory packages and the bottom NOC 204 is associated with an interface 258 for four additional channels for communicating with memory packages. Each interface 228/258 includes four Toggle Mode interfaces (TM Interface), four buffers and four schedulers. There is one scheduler, buffer and TM Interface for each of the channels. The processor can be any standard processor known in the art. The data path controllers 222/252 can be a processor, FPGA, microprocessor or other type of controller. The XOR engines 224/254 and ECC engines 226/256 are dedicated hardware circuits, known as hardware accelerators. In other embodiments, the XOR engines 224/254 and ECC engines 226/256 can be implemented in software. The scheduler, buffer, and TM Interfaces are hardware circuits.

FIG. 1D is a block diagram of one embodiment of a memory package 104 that includes a plurality of memory die 300 connected to a memory bus 294 (data lines and chip enable lines). The memory bus 294 connects to a Toggle Mode Interface 296 for communicating with the TM Interface of a BEP circuit 112 (see e.g., FIG. 1C). In some embodiments, the memory package can include a small controller connected to the memory bus and the TM Interface. The memory package can have one or more memory die. In one embodiment, each memory package includes eight or 16 memory die; however, other numbers of memory die can also be implemented. The technology described herein is not limited to any particular number of memory die.

Figure 2A:
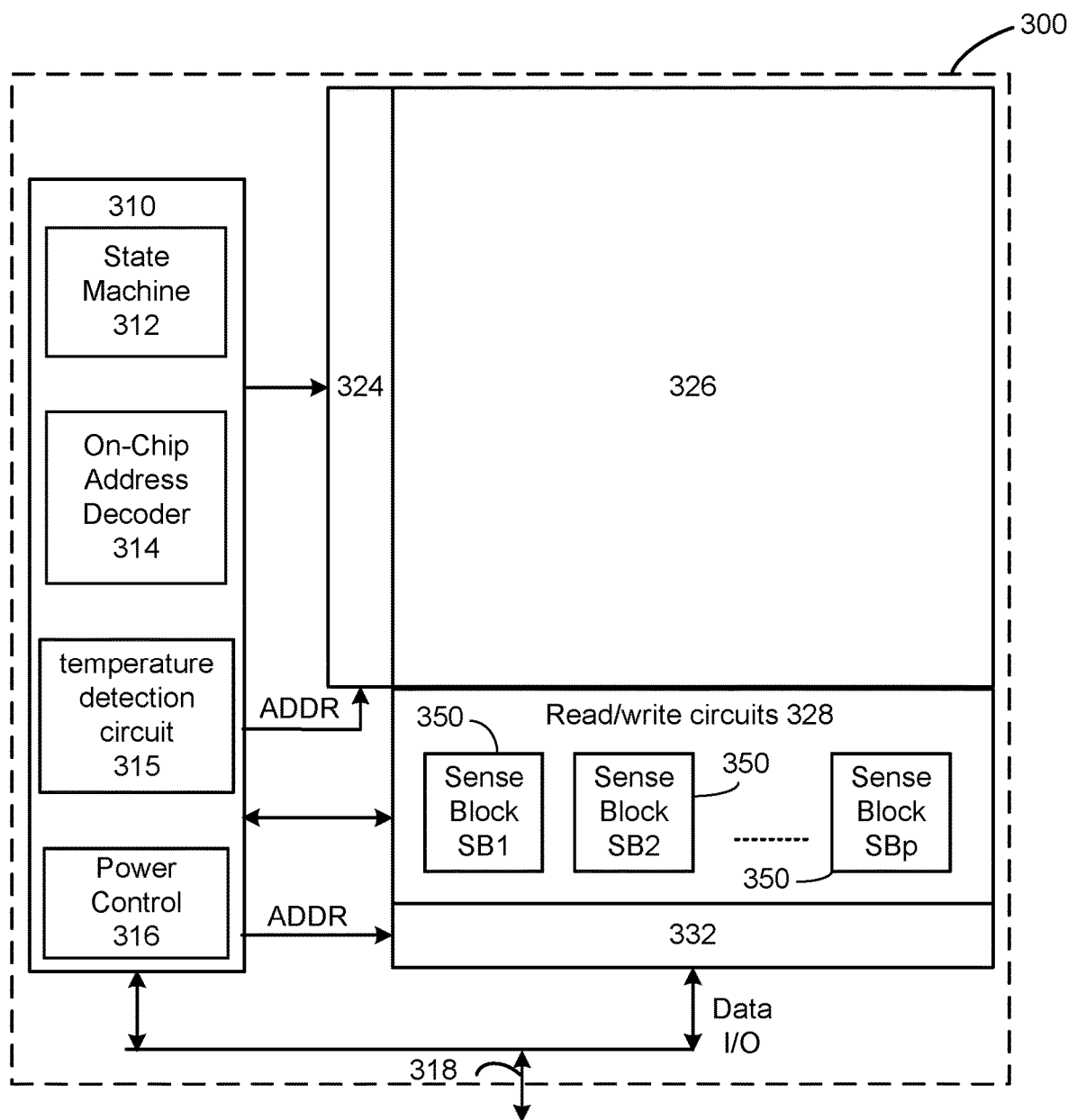
FIG. 2A is a functional block diagram of an embodiment of a memory die.

FIG. 2A is a functional block diagram of one embodiment of a memory die 300. Each of the one or more memory die 300 of FIG. 1D can be implemented as memory die 300 of FIG. 2. The components depicted in FIG. 2 are electrical circuits. In one embodiment, each memory die 300 includes a memory structure 326, control circuits 310, and read/write circuits 328, all of which are electrical circuits. Memory structure 326 is addressable by word lines via a row decoder 324 and by bit lines via a column decoder 332. The read/write circuits 328 include multiple sense blocks 350 including SB1, SB2, . . . , SBp (sensing circuits) and allow a page (or multiple pages) of data in multiple memory cells to be read or programmed in parallel. In one embodiment, each sense block includes a sense amplifier and a set of latches connected to the bit line. The latches store data to be written and/or data that has been read. The sense blocks include bit line drivers.

Commands and data are transferred between the controller and the memory die 300 via lines 318, which may form a bus between memory die 300 and the controller (e.g., memory bus 294). In one embodiment, memory die 300 includes a set of input and/or output (I/O) pins that connect to lines 318.

Control circuits 310 cooperate with the read/write circuits 328 to perform memory operations (e.g., write, read, erase, and others) on memory structure 326. In one embodiment, control circuits 310 includes a state machine 312, an on-chip address decoder 314, a power control module 316 (power control circuit) and a temperature detection circuit 315. State machine 312 provides die-level control of memory operations. In one embodiment, state machine 312 is programmable by software. In other embodiments, state machine 312 does not use software and is completely implemented in hardware (e.g., electrical circuits). In some embodiments, state machine 312 can be replaced by a microcontroller or microprocessor. In one embodiment, control circuits 310 includes buffers such as registers, ROM fuses and other storage devices for storing default values such as base voltages and other parameters.

The on-chip address decoder 314 provides an address interface between addresses used by controller 102 to the hardware address used by the decoders 324 and 332. Power control module 316 controls the power and voltages supplied to the word lines and bit lines during memory operations. Power control module 316 may include charge pumps for creating voltages.

For purposes of this document, control circuits 310, alone or in combination with read/write circuits 328 and decoders 324/332, comprise one or more control circuits for memory structure 326. These one or more control circuits are electrical circuits that perform the functions described below in the flow charts and signal diagrams. In other embodiments, the one or more control circuits can consist only of controller 102, which is an electrical circuit in combination with software, that performs the functions described below in the flow charts and signal diagrams. In another alternative, the one or more control circuits comprise controller 102 and control circuits 310 performing the functions described below in the flow charts and signal diagrams. In another embodiment, the one or more control circuits comprise state machine 312 (or a microcontroller or microprocessor) alone or in combination with controller 102.

In one embodiment, memory structure 326 comprises a monolithic three-dimensional memory array of non-volatile memory cells in which multiple memory levels are formed above a single substrate, such as a wafer. The memory structure may comprise any type of non-volatile memory that is monolithically formed in one or more physical levels of arrays of memory cells having an active area disposed above a silicon (or other type of) substrate. In one example, the non-volatile memory cells of memory structure 326 comprise vertical NAND strings with charge-trapping material such as described, for example, in U.S. Pat. No. 9,721,662, incorporated herein by reference in its entirety. In another embodiment, memory structure 326 comprises a two-dimensional memory array of non-volatile memory cells. In one example, the non-volatile memory cells are NAND flash memory cells utilizing floating gates such as described, for example, in U.S. Pat. No. 9,082,502, incorporated herein by reference in its entirety. Other types of memory cells (e.g., NOR-type flash memory) can also be used.

In one embodiment, the control circuit(s) (e.g., control circuits 310) are formed on a first die, referred to as a control die, and the memory array (e.g., memory structure 326) is formed on a second die, referred to as a memory die. For example, some or all control circuits (e.g., control circuit 310, row decoder 324, column decoder 332, and read/write circuits 328) associated with a memory may be formed on the same control die. A control die may be bonded to one or more corresponding memory die to form an integrated memory assembly. The control die and the memory die may have bond pads arranged for electrical connection to each other. Bond pads of the control die and the memory die may be aligned and bonded together by any of a variety of bonding techniques, depending in part on bond pad size and bond pad spacing (i.e., bond pad pitch). In some embodiments, the bond pads are bonded directly to each other, without solder or other added material, in a so-called Cu-to-Cu bonding process. In some examples, dies are bonded in a one-to-one arrangement (e.g., one control die to one memory die). In some examples, there may be more than one control die and/or more than one memory die in an integrated memory assembly. In some embodiments, an integrated memory assembly includes a stack of multiple control die and/or multiple memory die. In some embodiments, the control die is connected to, or otherwise in communication with, a memory controller. For example, a memory controller may receive data to be programmed into a memory array. The memory controller will forward that data to the control die so that the control die can program that data into the memory array on the memory die.

FIG. 2B shows an alternative arrangement to that of FIG. 2A which may be implemented using wafer-to-wafer bonding to provide a bonded die pair. FIG. 2B depicts a functional block diagram of one embodiment of an integrated memory assembly 307. One or more integrated memory assemblies 307 may be used in a memory package 104 in memory system 100. The integrated memory assembly 307 includes two types of semiconductor die (or more succinctly, "die"). Memory die 301 includes memory array 326 (memory structure). Memory array 326 may contain non-volatile memory cells.

Control die 311 includes column control circuitry 364, row control circuitry 320 and system control logic 360 (including state machine 312, power control module 316, storage 366, and memory interface 368). In some embodiments, control die 311 is configured to connect to the memory array 326 in the memory die 301. FIG. 2B shows an example of the peripheral circuitry, including control circuits, formed in a peripheral circuit or control die 311 coupled to memory array 326 formed in memory die 301. System control logic 360, row control circuitry 320, and column control circuitry 364 are located in control die 311. In some embodiments, all or a portion of the column control circuitry 364 and all or a portion of the row control circuitry 320 are located on the memory die 301. In some embodiments, some of the circuitry in the system control logic 360 is located on the on the memory die 301.

System control logic 360, row control circuitry 320, and column control circuitry 364 may be formed by a common process (e.g., CMOS process), so that adding elements and functionalities, such as ECC, more typically found on a memory controller 102 may require few or no additional process steps (i.e., the same process steps used to fabricate controller 102 may also be used to fabricate system control logic 360, row control circuitry 320, and column control circuitry 364). Thus, while moving such circuits from a die such as memory die 301 may reduce the number of steps needed to fabricate such a die, adding such circuits to a die such as control die 311 may not require many additional process steps.

FIG. 2B shows column control circuitry 364 including sense block(s) 350 on the control die 311 coupled to memory array 326 on the memory die 301 through electrical paths 370. For example, electrical paths 370 may provide electrical connection between column decoder 332, driver circuitry 372, and block select 373 and bit lines of memory array (or memory structure) 326. Electrical paths may extend from column control circuitry 364 in control die 311 through pads on control die 311 that are bonded to corresponding pads of the memory die 301, which are connected to bit lines of memory structure 326. Each bit line of memory structure 326 may have a corresponding electrical path in electrical paths 370, including a pair of bond pads, which connects to column control circuitry 364. Similarly, row control circuitry 320, including row decoder 324, array drivers 374, and block select 376 are coupled to memory array 326 through electrical paths 308. Each of electrical path 308 may correspond to a word line, dummy word line, or select gate line. Additional electrical paths may also be provided between control die 311 and memory structure die 301.

In some embodiments, there is more than one control die 311 and/or more than one memory die 301 in an integrated memory assembly 307. In some embodiments, the integrated memory assembly 307 includes a stack of multiple control die 311 and multiple memory structure die 301. In some embodiments, each control die 311 is affixed (e.g., bonded) to at least one of the memory structure dies 301.

The exact type of memory array architecture or memory cell included in memory structure 326 is not limited to the examples above. Many different types of memory array architectures or memory cell technologies can be used to form memory structure 326. No particular non-volatile memory technology is required for purposes of the new claimed embodiments proposed herein. Other examples of suitable technologies for memory cells of the memory structure 326 include ReRAM memories, magnetoresistive memory (e.g., MRAM, Spin Transfer Torque MRAM, Spin Orbit Torque MRAM), phase change memory (e.g., PCM), and the like. Examples of suitable technologies for architectures of memory structure 326 include two dimensional arrays, three dimensional arrays, cross-point arrays, stacked two dimensional arrays, vertical bit line arrays, and the like.

One example of a ReRAM, or PCMRAM, cross point memory includes reversible resistance-switching elements arranged in cross point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive memory (MRAM) stores data by magnetic storage elements. The elements are formed from two ferromagnetic plates, each of which can hold a magnetization, separated by a thin insulating layer. One of the two plates is a permanent magnet set to a particular polarity; the other plate's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. Note that the use of "pulse" in this document does not require a square pulse, but includes a (continuous or non-continuous) vibration or burst of sound, current, voltage light, or other wave.

A person of ordinary skill in the art will recognize that the technology described herein is not limited to a single specific memory structure, but covers many relevant memory structures within the spirit and scope of the technology as described herein and as understood by one of ordinary skill in the art.

Figure 3:
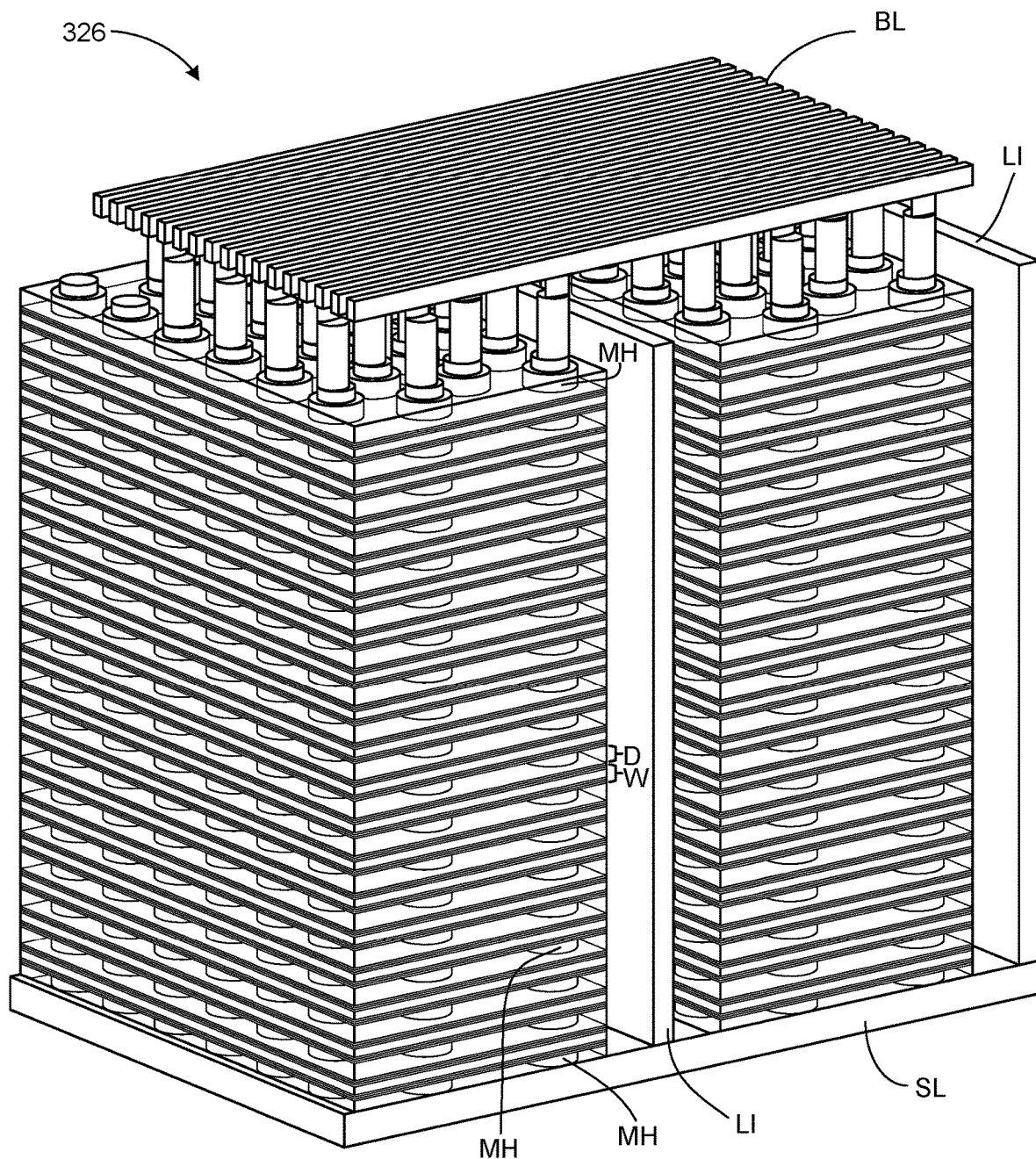
FIG. 3 is a perspective view of a portion of one embodiment of a monolithic three-dimensional memory structure.

FIG. 3 is a perspective view of a portion of one example embodiment of a monolithic three-dimensional memory array that can comprise memory structure 326, which includes a plurality memory cells. For example, FIG. 3 shows a portion of one block of memory. The structure depicted includes a set of bit lines BL positioned above a stack of alternating dielectric layers and conductive layers. For example purposes, one of the dielectric layers is marked as D and one of the conductive layers (also called word line layers) is marked as W. The number of alternating dielectric layers and conductive layers can vary based on specific implementation requirements. One set of embodiments includes between 108-278 alternating dielectric layers and conductive layers, for example, 127 data word line layers, 8 select layers, 4 dummy word line layers and 139 dielectric layers.

More or fewer than 108-278 layers can also be used. As will be explained below, the alternating dielectric layers and conductive layers are divided into four "fingers" by local interconnects LI. FIG. 3 shows two fingers and two local interconnects LI. Below and the alternating dielectric layers and word line layers is a source line layer SL. Memory holes are formed in the stack of alternating dielectric layers and conductive layers. For example, one of the memory holes is marked as MH. Note that in FIG. 3, the dielectric layers are depicted as see-through so that the reader can see the memory holes positioned in the stack of alternating dielectric layers and conductive layers. In one embodiment, NAND strings are formed by filling the memory hole with materials including a charge-trapping layer to create a vertical column of memory cells. Each memory cell can store one or more bits of data. More details of the three-dimensional monolithic memory array that comprises memory structure 326 is provided below with respect to FIG. 4A-4C.

Figure 4A:
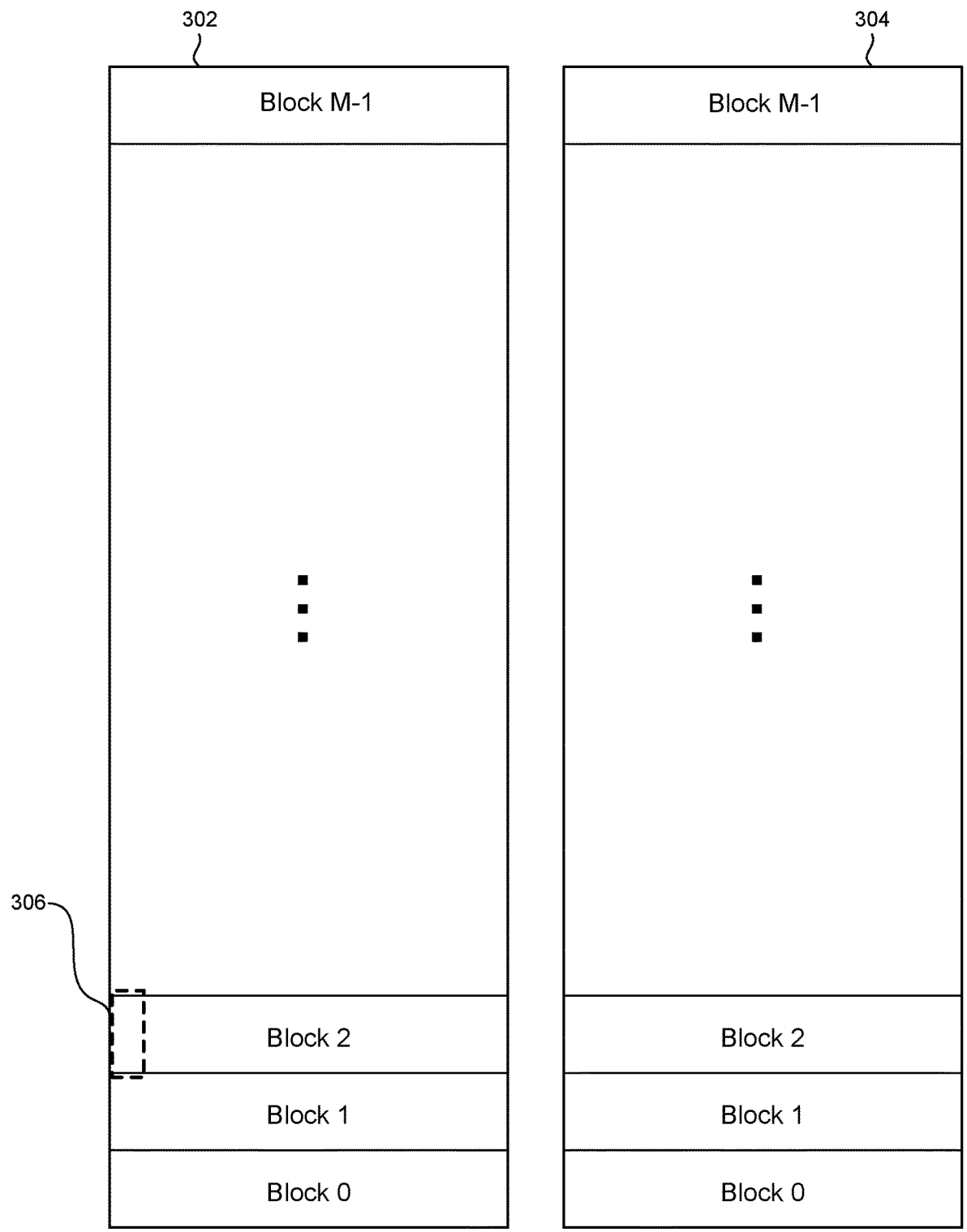
FIG. 4A is a block diagram of a memory structure having two planes.

FIG. 4A is a block diagram explaining one example organization of memory structure 326, which is divided into two planes 302 and 304. Each plane is then divided into M blocks. In one example, each plane has about 2000 blocks. However, different numbers of blocks and planes can also be used. In on embodiment, a block of memory cells is a unit of erase. That is, all memory cells of a block are erased together. In other embodiments, memory cells can be grouped into blocks for other reasons, such as to organize the memory structure 326 to enable the signaling and selection circuits. In some embodiments, a block represents a groups of connected memory cells as the memory cells of a block share a common set of word lines.

Figure 4B:
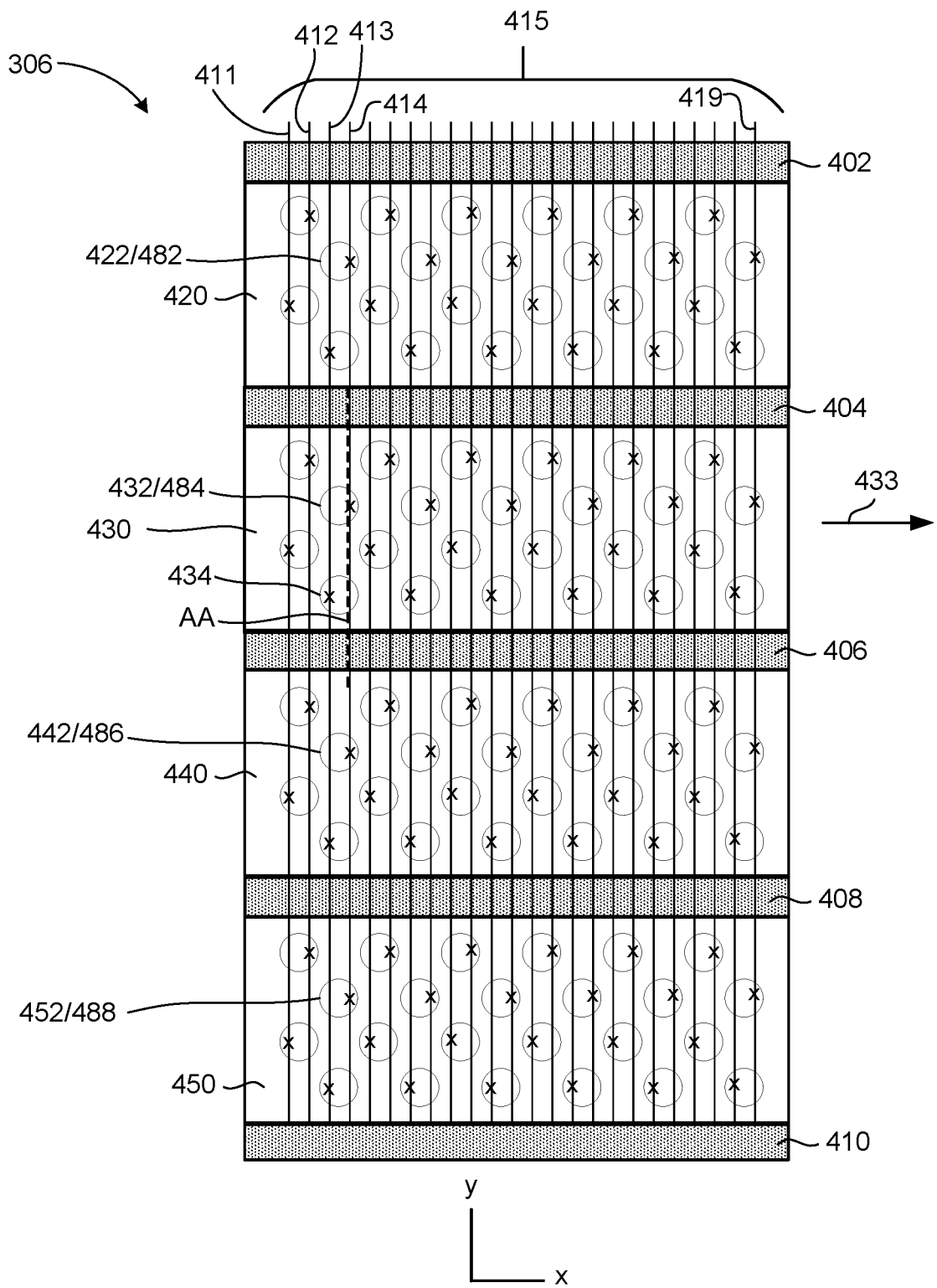
FIG. 4B depicts a top view of a portion of a block of memory cells.

FIGS. 4B-4C depict an example three dimensional ("3D") NAND structure. FIG. 4B is a block diagram depicting a top view of a portion of one block from memory structure 326. The portion of the block depicted in FIG. 4B corresponds to portion 306 in block 2 of FIG. 4A. As can be seen from FIG. 4B, the block depicted in FIG. 4B extends in the direction of 433. In one embodiment, the memory array has sixty layers. Other embodiments have less than or more than sixty layers. However, FIG. 4B only shows the top layer.

FIG. 4B depicts a plurality of circles that represent the vertical columns. Each of the vertical columns include multiple select gates (also referred to as a select transistors) and multiple memory cells (also referred to as data memory cells). In one embodiment, each vertical column implements a NAND string. For example, FIG. 4B depicts vertical columns 422, 432, 442 and 452. Vertical column 422 implements NAND string 482. Vertical column 432 implements NAND string 484. Vertical column 442 implements NAND string 486. Vertical column 452 implements NAND string 488. More details of the vertical columns are provided below. Since the block depicted in FIG. 4B extends in the direction of arrow 433, the block includes more vertical columns than depicted in FIG. 4B.

FIG. 4B also depicts a set of bit lines 415, including bit lines 411, 412, 413, 414, . . . 419. FIG. 4B shows twenty-four bit lines because only a portion of the block is depicted. It is contemplated that more than twenty-four bit lines may be connected to vertical columns of the block. Each of the circles representing vertical columns has an "x" to indicate its connection to one bit line. For example, bit line 414 is connected to vertical columns 422, 432, 442 and 452.

The block depicted in FIG. 4B includes a set of local interconnects 402, 404, 406, 408 and 410 that connect the various layers to a source line below the vertical columns. Local interconnects 402, 404, 406, 408 and 410 also serve to divide each layer of the block into four regions; for example, the top layer depicted in FIG. 4B is divided into regions 420, 430, 440 and 450, which are referred to as fingers. In the layers of the block that implement memory cells, the four regions are referred to as word line fingers that are separated by the local interconnects. In one embodiment, the word line fingers on a common level of a block connect together at the end of the block to form a single word line. In another embodiment, the word line fingers on the same level are not connected together. In one example implementation, a bit line only connects to one vertical column in each of regions 420, 430, 440 and 450. In that implementation, each block has sixteen rows of active columns and each bit line connects to four rows in each block. In one embodiment, all of four rows connected to a common bit line are connected to the same word line (via different word line fingers on the same level that are connected together); therefore, the system uses the source side selection lines and the drain side selection lines to choose one (or another subset) of the four to be subjected to a memory operation (program, verify, read, and/or erase).

Although FIG. 4B shows each region having four rows of vertical columns, four regions and sixteen rows of vertical columns in a block, those exact numbers are an example implementation. Other embodiments may include more or less regions per block, more or less rows of vertical columns per region and more or less rows of vertical columns per block.

FIG. 4B also shows the vertical columns being staggered. In other embodiments, different patterns of staggering can be used. In some embodiments, the vertical columns are not staggered.

FIG. 4C depicts a portion of one embodiment of a three-dimensional memory structure 326 showing a cross-sectional view along line AA of FIG. 4B. This cross-sectional view cuts through vertical columns 432 and 434 and region 430 (see FIG. 4B). The structure of FIG. 4C includes four drain side select layers SGD0, SGD1, SGD2 and SGD3 associated with the drain side select gates; four source side select layers SGS0, SGS1, SGS2 and SGS3 associated with the source side select gates; four dummy word line layers DD0, DD1, DS0 and DS1; and forty-eight data word line layers WLL0-WLL127 for connecting to data memory cells. Other embodiments can implement more or less than four drain side select layers, more or less than four source side select layers, more or less than four dummy word line layers, and more or less than one hundred- and twenty-eight-word line layers. Vertical columns 432 and 434 are depicted protruding through the drain side select layers, source side select layers, dummy word line layers and word line layers. In one embodiment, each vertical column comprises a NAND string. For example, vertical column 432 comprises NAND string 484. Below the vertical columns and the layers listed below is substrate 101, an insulating film 454 on the substrate, and source line SL. The NAND string of vertical column 432 has a source end at a bottom of the stack and a drain end at a top of the stack. As in agreement with FIG. 4B, FIG. 4C show vertical column 432 connected to bit line 414 via connector 418. Local interconnects 404 and 406 are also depicted.

For ease of reference, drain side select layers SGD0, SGD1, SGD2 and SGD3; source side select layers SGS0, SGS1, SGS2 and SGS3; dummy word line layers DD0, DD1, DS0 and DS1; and word line layers WLL0-WLL127 collectively are referred to as the conductive layers. In one embodiment, the conductive layers are made from a combination of TiN and Tungsten. In other embodiments, other materials can be used to form the conductive layers, such as doped polysilicon, metal such as Tungsten or metal silicide. In some embodiments, different conductive layers can be formed from different materials. Between conductive layers are dielectric layers DL0-DL141. For example, dielectric layers DL131 is above word line layer WLL123 and below word line layer WLL124. In one embodiment, the dielectric layers are made from $SiO_2$. In other embodiments, other dielectric materials can be used to form the dielectric layers.

The non-volatile memory cells are formed along vertical columns which extend through alternating conductive and dielectric layers in the stack. In one embodiment, the memory cells are arranged in NAND strings. The word line layers WLL0-WLL127 connect to memory cells (also called data memory cells). Dummy word line layers DD0, DD1, DS0 and DS1 connect to dummy memory cells. A dummy memory cell does not store host data (data provided from the host, such as data from a user of the host), while a data memory cell is eligible to store host data. Drain side select layers SGD0, SGD1, SGD2 and SGD3 are used to electrically connect and disconnect NAND strings from bit lines. Source side select layers SGS0, SGS1, SGS2 and SGS3 are used to electrically connect and disconnect NAND strings from the source line SL.

Although the example memory system of FIGS. 3-4C is a three-dimensional memory structure that includes vertical NAND strings with charge-trapping material, other (2D and 3D) memory structures can also be used with the technology described herein.

The memory systems discussed above can be erased, programmed and read. At the end of a successful programming process (with verification), the threshold voltages of the memory cells should be within one or more distributions of threshold voltages for programmed memory cells or within a distribution of threshold voltages for erased memory cells, as appropriate.

Figure 5:
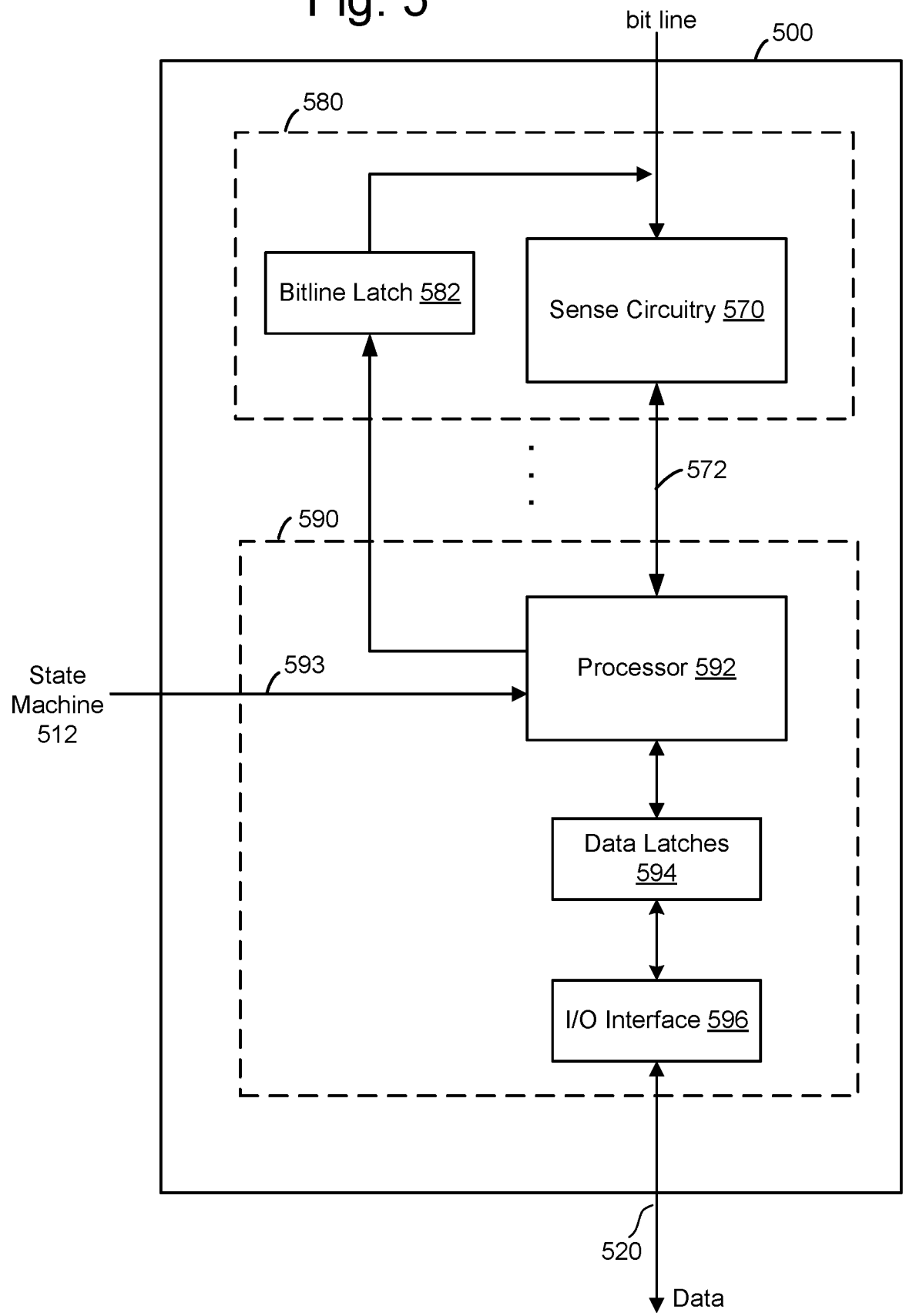
FIG. 5 shows an example of a sense block.

FIG. 5 depicts one embodiment of a sense block 500, such as sense block 350 in FIGS. 2A-B. An individual sense block 500 may be partitioned into a core portion, referred to as a sense module 580, and a common portion 590. In one embodiment, there is a separate sense module 580 for each bit line and one common portion 590 for a set of multiple sense modules 580. In one example, a sense block will include one common portion 590 and eight sense modules 580. Each of the sense modules in a group will communicate with the associated common portion via a data bus 572.

Sense module 580 comprises sense circuitry 570 that determines whether a conduction current in a connected bit line is above or below a predetermined threshold level. Sense module 580 also includes a bit line latch 582 that is used to set a voltage condition on the connected bit line. For example, a predetermined state latched in bit line latch 582 may result in the connected bit line being pulled to a state designating program inhibit voltage (e.g., 1.5-3 V).

Common portion 590 comprises a processor 592, a set of data latches 594, and an I/O Interface 596 coupled between the set of data latches 594 and data bus 520. Processor 592 performs computations. For example, processor 592 may determine the data stored in the sensed storage element and store the determined data in the set of data latches. Processor 592 may also move data between latches and perform operations on data in latches (e.g., performing logic operations such as Exclusive OR (XOR) operations. The set of data latches 594 may be used to store data bits determined by processor 592 during a read operation or to store data bits imported from the data bus 520 during a program operation. The imported data bits represent write data meant to be programmed into a memory array, such as memory array 501 in FIG. 5. I/O Interface 596 provides an interface between data latches 594 and the data bus 520.

During a read operation or other storage element sensing operation, a state machine, such as state machine 512 in FIG. 5, controls the supply of different control gate voltages to the addressed storage elements. As it steps through the various predefined control gate voltages corresponding to the various memory states supported by the memory, the sense module 580 may trip at one of these voltages and an output will be provided from sense module 580 to processor 592 via data bus 572. At that point, processor 592 determines the resultant memory state by consideration of the tripping event(s) of the sense module and the information about the applied control gate voltage from the state machine via input lines 593. It then computes a binary encoding for the memory state and stores the resultant data bits into data latches 594. In another embodiment of the core portion, bit line latch 582 serves both as a latch for latching the output of the sense module 580 and as a bit line latch as described above.

During a programming operation, the data to be programmed is stored in the set of data latches 594. The programming operation, under the control of the state machine 512, comprises a series of programming voltage pulses applied to the control gates of the addressed storage elements. Each program pulse is followed by a read back (or verify process) to determine if the storage element has been programmed to the desired memory state. Processor 592 monitors the read back memory state relative to the desired memory state. When the two are in agreement, the processor 592 sets the bit line latch 582 so as to cause the bit line to be pulled to a state designating program inhibit voltage. This inhibits the storage element coupled to the bit line from further programming even if program pulses appear on its control gate. In other embodiments, the processor initially loads the bit line latch 582 and the sense circuitry sets it to an inhibit value during the verify operation.

Data latches 594 include a stack of data latches corresponding to the sense module. In one embodiment, there are three or more data latches per sense module 580. The data latches can be implemented as a shift register so that the parallel data stored therein is converted to serial data for data bus 520, and vice-versa. All the data latches corresponding to a read/write block can be linked together to form a block shift register so that a block of data can be input or output by serial transfer. In particular, the bank of read/write modules may be configured such that each of its set of data latches will shift data in to or out of the data bus in sequence as if they are part of a shift register for the entire read/write block.

Figure 6:
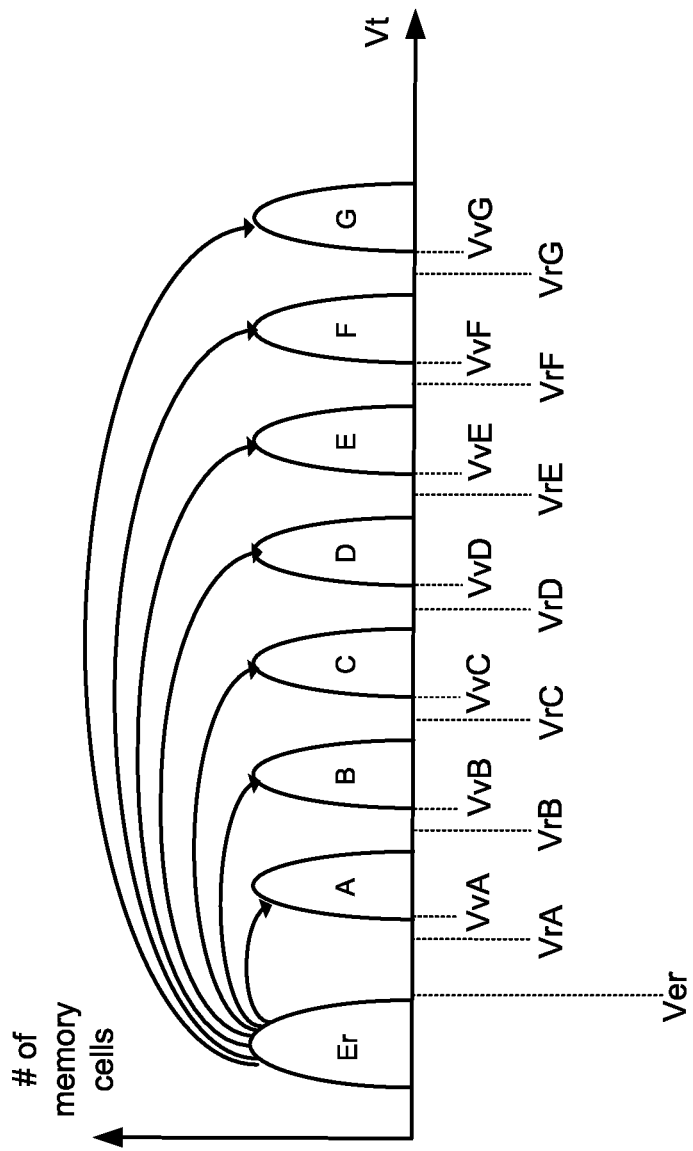
FIG. 6 shows multiple data states of nonvolatile memory cells.

FIG. 6 illustrates an example threshold voltage distributions for the memory array when each memory cell stores three bits of data. Other embodiments, however, may use other data capacities per memory cell (e.g., such as one, two, four, or five bits of data per memory cell). Storing more than one bit of data per memory cell using more than two data states is referred to as Multi-Level Cell (MLC), e.g., storing two bits per cell using four data states is an example of MLC. Storing one bit of data per memory cell using two data states is referred to a Single-Level Cell (SLC). Storing four bits of data per memory cell using sixteen data states is referred to as Quad-Level Cell (QLC). FIG. 6 shows eight threshold voltage distributions, corresponding to eight data states. The first threshold voltage distribution (data state) Er represents memory cells that are erased. The other seven threshold voltage distributions (data states) A-G represent memory cells that are programmed and, therefore, are also called programmed states. Each threshold voltage distribution (data state) corresponds to predetermined values for the set of data bits.

FIG. 6 shows seven verify reference voltages, VvA, VvB, VvC, VvD, VvE, VvF, and VvG. When programming memory cells to data state A, the system will test whether those memory cells have a threshold voltage greater than or equal to VvA. When programming memory cells to data state B, the system will test whether the memory cells have threshold voltages greater than or equal to VvB. When programming memory cells to data state C, the system will determine whether memory cells have their threshold voltage greater than or equal to VvC, and so on up to state G. FIG. 6 also shows Ver, which is a voltage level to test whether a memory cell has been properly erased.

FIG. 6 also shows seven read reference voltages, VrA, VrB, VrC, VrD, VrE, VrF, and VrG for reading data from memory cells. By testing whether the threshold voltage of a given memory cell is above or below the seven read reference voltages (e.g., performing sense operations using a sense block such as sense block 350), the system can determine what data state (e.g., Er, A, B, C, . . . ) a memory cell is in. The specific relationship between the data programmed into the memory cell and the threshold voltage levels of the cell depends upon the data encoding scheme adopted for the cells. In one embodiment, data values are assigned to the threshold voltage ranges using a Gray code assignment so that if the threshold voltage of a memory erroneously shifts to its neighboring physical state, only one bit will be affected. While FIG. 6 shows all data states being programmed from the erased state together, in other examples, particularly with large numbers of data states, programming may be performed in multiple operations. For example, memory cells may be programmed to first distributions at first time and subsequently further programmed to second distributions (e.g., after neighboring memory cells are programmed). For example, first distributions may be approximate (foggy) distributions and second distributions may be more accurate (fine) distributions with higher verify voltages in what may be referred to as a "foggy-fine" programming scheme.

Figure 7:
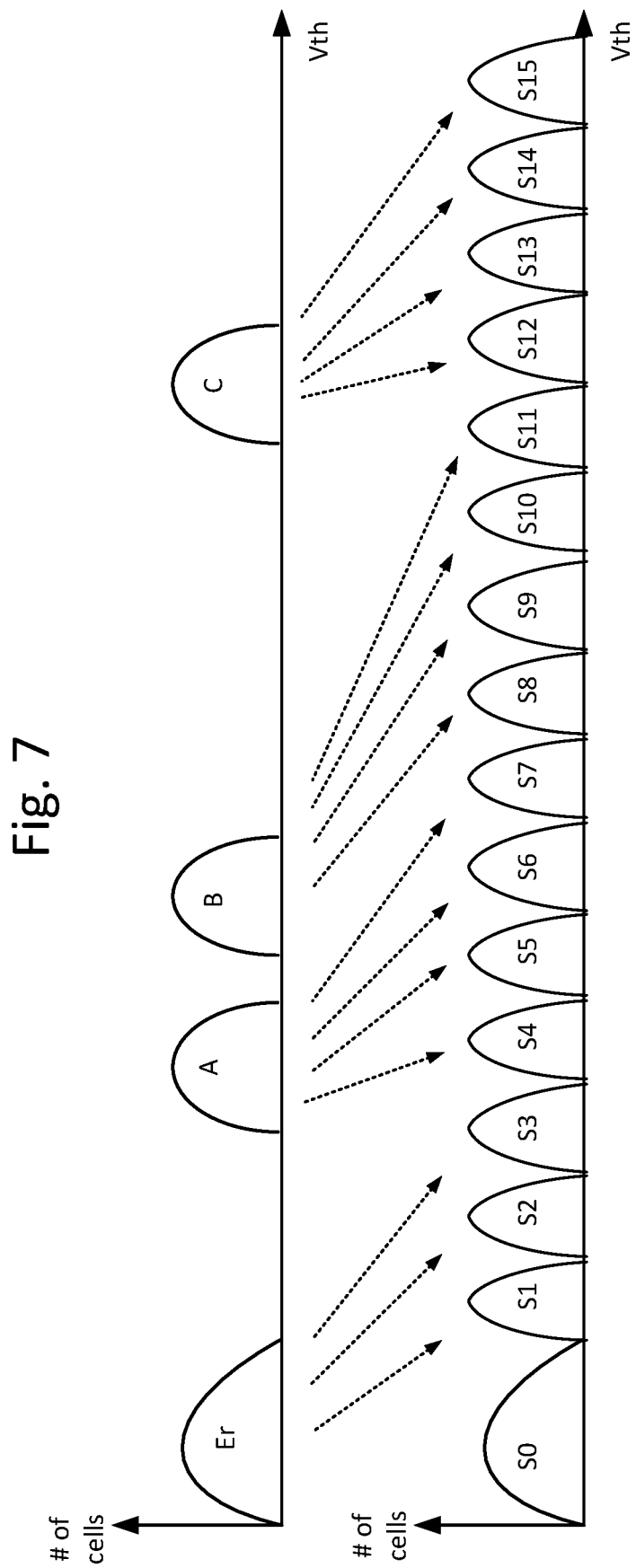
FIG. 7 shows an example of MLC-fine programming.

FIG. 7 shows an example of MLC-fine programming for QLC memory cells (e.g., in memory structure 326) that are initially programmed into four initial data states, Er, A, B, and C, roughly corresponding to fine data states S0, S4, S6, and S12. The top portion of FIG. 7 shows initial distributions Er, A, B, and C resulting from initial (MLC) programming while the bottom portion shows distributions S0 to S15 resulting from subsequent final (fine) programming and shows the correspondence between MLC and fine data states. MLC programmed data uses the four initial data states Er, A, B, and C (four data states representing two bits) while fine programmed data uses the sixteen data states S0-S15 (sixteen fine data states representing four bits). Non-volatile memory cells are MLC programmed with two bits of data and subsequently fine programmed with two additional bits of data using an appropriate encoding scheme.

Prior to fine programming, MLC programmed data may be read (e.g., by sensing to identify non-volatile memory cells in data states Er, A, B, and C) to obtain two bits of data and then the non-volatile memory cells may be further programmed with an additional two bits of data (further programmed from data states Er, A, B, and C to data states S0-S15). FIG. 8 shows an example of reading a plurality of non-volatile memory cells that are MLC programmed (not yet fine programmed, as shown in the upper portion of FIG. 7) to obtain two bits of data per cell (e.g., to obtain two initial logical pages of data from a physical page of non-volatile memory cells). Each distribution is shown with a corresponding data state that includes a first and a second bit corresponding to first and second logical page data. For example, distribution Er corresponds to a first bit "1" and second bit "1". Distribution A corresponds to a first bit "1" and second bit "0". Distribution B corresponds to first and second bits "0". Distribution C corresponds to first bit "0" and second bit "1". Reading the non-volatile memory cells at the three read voltages shown, VrA, VrB, and VrC allows non-volatile memory cells to be identified as belonging to one of these four distribution so that the first and second logical pages of data may be obtained. The two logical pages of data thus obtained may be combined with additional data for fine programming.

FIG. 9 shows an example of an encoding scheme that may be used in an MLC-fine programming (e.g., in FIG. 7) or other programming scheme, which uses sixteen data states to store four bits per non-volatile memory cell (QLC programming scheme). Using such a scheme, a group of non-volatile memory cells may store four logical pages of data (Lower, Middle, Upper, and Top pages) as illustrated, with each memory cell holding one bit from each logical page. The encoding scheme may be referred to as an example of a 3-2-5-5 encoding scheme, indicating the number of read levels required for reading each logical page illustrated. For example, the lower page may be obtained by reading at S6, S8 and S10, (3 read levels) the middle page may be obtained by reading at S4 and S12 (2 read voltages), the upper page may be obtained by reading at S2, S5, S9, S13, and S15 (5 read voltages), and the top page may be obtained by reading at S1, S3, S7, S11, and S14 (5 read voltages). Other encoding schemes may also be used. While the scheme of FIG. 9 may be convenient for efficient reading of data, other schemes may have other characteristics that make them appropriate in some instances. For example, some encoding schemes may be convenient for programming data. In some cases, data may be converted between encoding schemes to take advantage of characteristics of different schemes. While data may be received as encoded data that is encoded in a state code as shown in FIG. 9, during programming the data may be converted to another encoding scheme (e.g., a program code) that may offer advantages for programming purposes.

Figure 10:
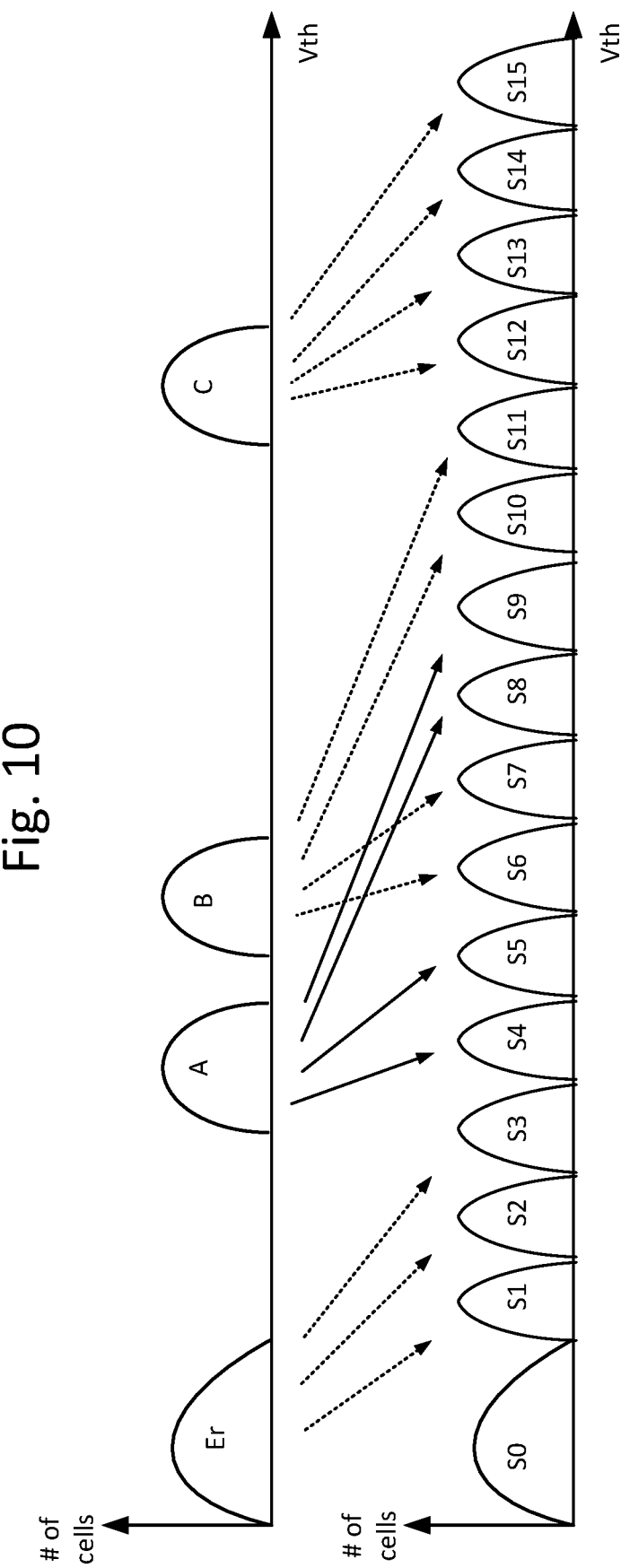
FIG. 10 shows another example of MLC-fine programming.

FIG. 10 illustrates an alternative MLC-fine programming scheme to that of FIG. 7. FIG. 10 shows a different mapping from the initial data states (Er, A, B, C) to the final data states (fine programmed data states S0-S15). While initial data state Er is mapped to final data states S0-S3 and initial data state C is mapped to final data states S12-S15 as before, the mapping from initial data states A and B to final data states S4-S11 is different from the example of FIG. 7. Instead of mapping initial data state A to neighboring distributions S4 to S7 and mapping initial data state B to neighboring distributions S8-S11, in FIG. 10 initial data state A is mapped to final data states S4-S5 and S8-S9 with initial data state B mapped to final data states S6-S7 and S10-S11. Thus, initial data states are mapped to final data states that occupy discontinuous threshold voltage ranges. Cells being fine programmed from initial data state A to final data states S8 and S9 transition through a threshold voltage range corresponding to initial data state B and final data states S6-S7. And cells being fine programmed from initial data state B to final data states S10 and S11 transition through a threshold voltage range corresponding to final data states S8 and S9. Such crossover of threshold voltages during fine programming may present additional challenges in certain scenarios, for example, when attempting to read data that is not completely programmed (e.g., when programming is aborted at an intermediate stage because of power loss or other reason).

In some cases, a read command may be received while the data to be read is being programmed (e.g., while a program operation is ongoing, after the operation has been initiated and prior to completion). In some cases, an accurate copy of the data being programmed may be available (e.g., from a buffer in a memory controller die, memory die, or elsewhere). In some cases, no such accurate copy is available because data to be programmed is loaded into data latches for programming and is not stored elsewhere. Such latched data is subsequently affected by program operations so that the original data does not remain in the latches. One approach to a read command that is received while programming of the data specified in the read command is ongoing is to wait for the ongoing program operation to finish and then read the data from the memory cells where it is programmed.

Figure 11:
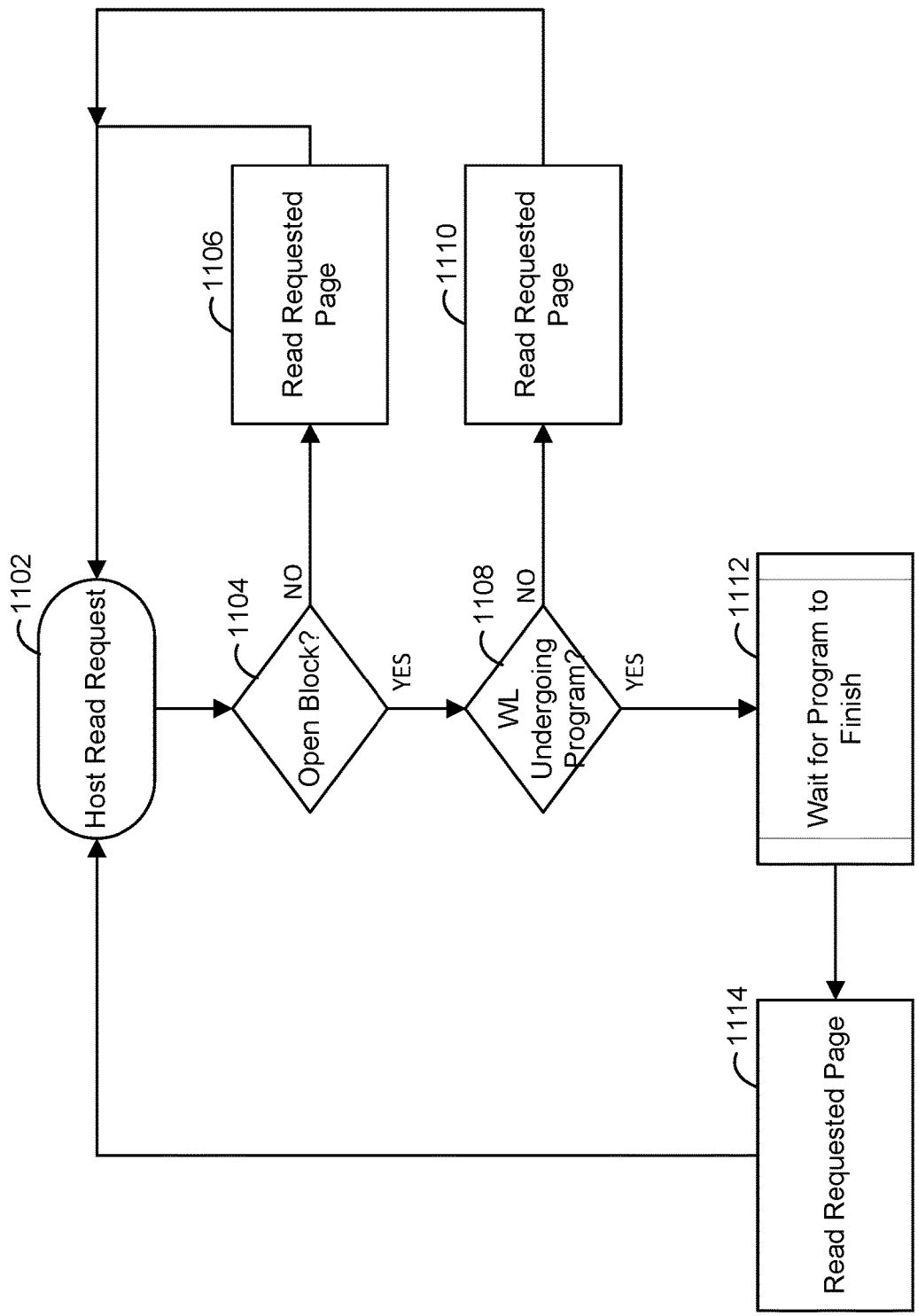
FIG. 11 shows an example of receiving a read command.

FIG. 11 shows an example of a read scheme. When a host read request is received 1102 (e.g., a command to read one or more logical pages of data), the physical location of the data to be read is determined (e.g., from logical-to-physical conversion) and it is determined if the physical location is in an open block 1104. If the physical location of the data is not in an open block (e.g., it is in a closed block where no further writes occur) then the requested page is read 1106. If the physical location of the data is in an open block then a further determination is made as to whether the physical location is along a word line (WL) undergoing a program operation 1108. If the physical location is not along a word line undergoing programming (e.g., it is along a word line that has already completed programming) then the requested page is read 1110. If the physical location is along a word line undergoing a program operation then the method includes waiting for the program operation to finish 1112 and subsequently reading the requested page 1114. Waiting for programming to finish 1112 may cause significant delay in some cases and may impact Quality of Service (Qos) of a data storage system. Aspects of the present technology enable quicker return of data when a read request is received that is directed to data stored along a word line that is currently undergoing a program operation (quicker than waiting for programming to complete).

In some examples, an ongoing program operation may be stopped at an intermediate stage and the data of one or more logical pages may be recovered and returned in response to a read command without waiting for completion of the program operation. For example, at least some data of the one or more logical pages (first partial data) may be obtained by reading the memory cells that were being programmed (memory cells at an intermediate stage of programming that are not all in their target threshold voltage ranges). Because the program operation has stopped at an intermediate stage, a complete copy of the data is not available from the memory cells. Additionally, at least some data of the one or more logical pages (second partial data) may be obtained from latches used to hold data that is being programmed (e.g., data latches 594). Because at least some programming has already occurred, a complete copy of the data may not be available from the latches. For example, data latches may be changed (flipped) as corresponding memory cells reach their target threshold voltage ranges so that the latched bits no longer correspond to the data that was being programmed. By combining the first partial data that is read from the memory cells and the second partial data that was stored in data latches, a complete copy of a logical page (or pages) may be obtained. This data may then be returned in response to the read command within a relatively short time (shorter than waiting for a program operation to complete). Subsequently, programming of the memory cells may resume from the intermediate stage so that the data is fully programmed.

Figure 12:
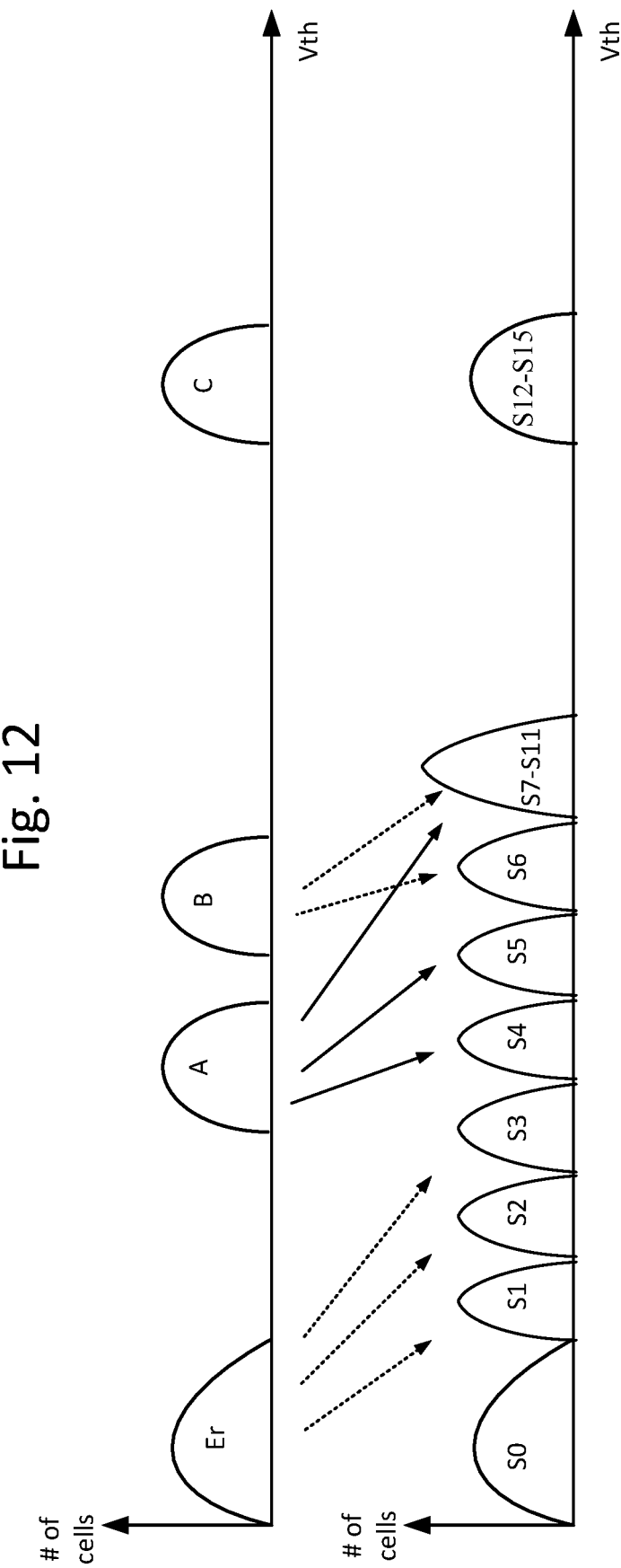
FIG. 12 shows an example of memory cells at an intermediate stage of programming.

FIG. 12 shows an example of non-volatile memory cells (e.g., in memory structure 326) that have been only partially programmed (e.g., with fine programming stopped at an intermediate stage, prior to completion of programming of all final data states S0-S15 as previously shown in FIG. 7). For example, when a read command is received that is directed to any one or more of the logical pages being programmed (one of four logical pages in the QLC example illustrated), programming may be stopped, which leaves memory cells with the threshold voltage distributions shown. These distributions are not all the target distributions for fine programming. The distribution for S7-S11 includes non-volatile memory cells that were previously in both A and B data states so that recovering the MLC programmed data represented by Er, A, B, and C states from the non-volatile memory cells may be difficult or impossible. Also, because memory cells being fine programmed to S7-S11 are in a single distribution, a read operation may not be able to resolve these data states so that data being fine programmed to S7-S11 may not be obtained by reading the memory cells. Similarly, memory cells being fine programmed to S12-S15 have not reached their target threshold voltage ranges and cannot be resolved by a read at this state.

In an example, first partial data may be obtained by reading memory cells at an intermediate stage (e.g., an intermediate stage as shown in FIG. 12). For example, data states S0 to S6 may be resolved by reading the partially programmed memory cells illustrated. Second partial data (e.g., data corresponding to data states S7 to S15) may be obtained from data latches used to store the data during programming (e.g., data latches 594). Because memory cells being programmed to S0-S6 have already completed programming at this intermediate stage, corresponding bits in data latches may have been flipped so that the first partial data may not be available from the latches. By combining first partial data (corresponding to data states S0-S6) from a read operation and second partial data (corresponding to data states S7-S15) from data latches, a complete copy (corresponding to all data states S0-S15) may be obtained. In some cases, data may be converted from one format (e.g., state code) to another format (e.g., program code) prior to programming it in non-volatile memory cells. In this case, partial data in data latches may not be identical to data that was received with a write command and some conversion may be required. In some cases, memory cells may have different programming speeds so that when programming stops at an intermediate stage some memory cells being programmed to a given data state may have reached their target threshold voltage (pass verify) while other memory cells being programmed to the same data state may not have reached their target threshold voltage (fail verify). Thus, while some or all memory cells of data states S0-S6 may be at their target threshold voltages, in some cases, at least some memory cells being programmed to some of data states S0-S6 may not yet have reached their target threshold voltages. Identification of which memory cells have reached their target threshold voltage may be performed on a cell-by-cell basis to ensure accurate identification.

Figure 13:
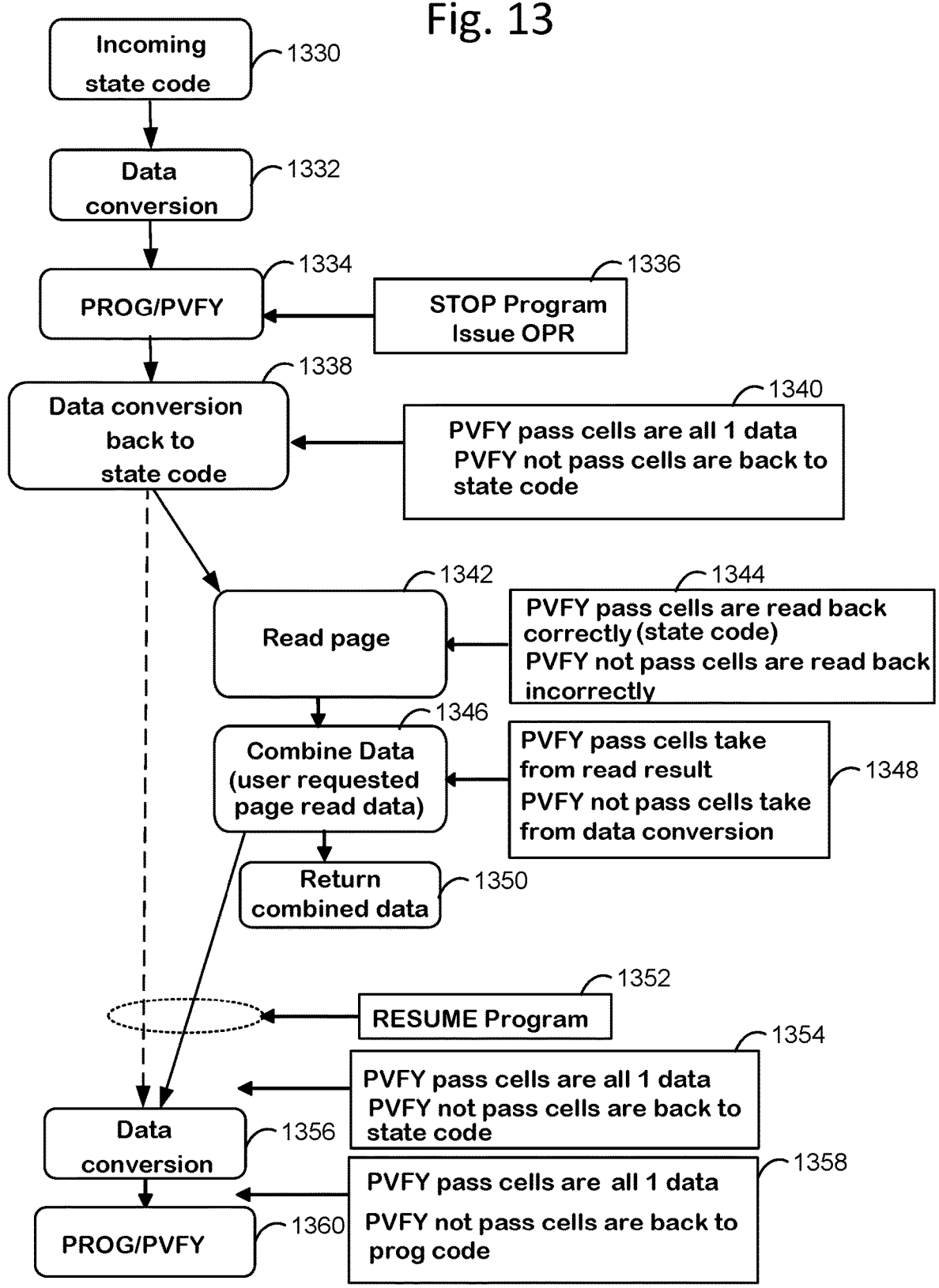
FIG. 13 shows an example an Ongoing Program Read (OPR) operation.

FIG. 13 illustrates an example of the present technology in which data is received as incoming state code data 1330 and is then subject to data conversion 1332 to convert it from state code to program code. Subsequently, a program operation is performed as a series of program and program verify steps "PROG/PVFY" 1334. In the example of FIG. 13, a command is received to STOP program and issue an Ongoing Program Read (OPR) 1336. Such a command may be triggered by receiving a read command from a host and determining that the read command is directed to one or more logical pages that are included in the ongoing programming operation (e.g., PROG/PVFY 1334). The STOP program command causes PROG/PVFY 1334 to stop prior to completion (e.g., before all memory cells have reached their target threshold voltages as illustrated in the example of FIG. 12). The issue OPR command causes initiation of an OPR operation that includes conversion of data stored in latches from program code back to state code 1338. In this example, any cells that pass PVFY (e.g., memory cells that are verified as reaching their target threshold voltage range) have all logic 1 bits in corresponding latches and cells that do not pass PVFY (e.g., memory cells that have not reached their target threshold voltage range) have bits in corresponding latches converted to state code 1340. In some cases, a combination of bits that indicates a memory cell has passed PVFY (e.g., all logic 1) may be the same in program code and state code so that such memory cells may be identified before or after conversion. Subsequently, a page read is performed 1342 to obtain data stored in the memory cells. The memory cells that passed PVFY are read back correctly (because they are in their target threshold voltage ranges) to provide corresponding state code and memory cells that did not pass PVFY (and are not in their target threshold voltage ranges) are read back incorrectly 1344. The first partial data read from PVFY pass cells is combined with second partial data from latches to obtain the user requested page read data 1346. The data to combine comes from two sources, the read results and the latched data (converted data). To obtain the logical page that was identified by the read command, for PVFY pass cells, the read result is taken and for PVFY not pass cells, the data conversion output from the latches is taken 1348. The combined data is then returned 1350 (e.g., to the host) in response to the read command. If more than one logical page is identified in the read command, each logical page may be obtained by combining the corresponding read data and latched data.

After the complete logical page is returned, the OPR operation may be considered complete. Subsequently, programming of the memory cells may resume 1352. Resumed programming may be automatic upon completion of the OPR operation, or in response to an appropriate command. When programming resumes, latched bits for memory cells that passed PVFY are all logic 1 and latched bits for memory cells that did not pass PVFY are in state code 1354 (as a result of data conversion to state code 1338). Data conversion 1356 converts the data in the latches from state code to program code. As a result, data latches for memory cells that did not pass PVFY are back to program code 1358 and one or more additional iterations of PROG/PVFY 1360 are used to complete programming (e.g., to bring memory cells that did not previously pass PVFY to their target threshold voltage ranges so that they pass PVFY).

Figure 14:
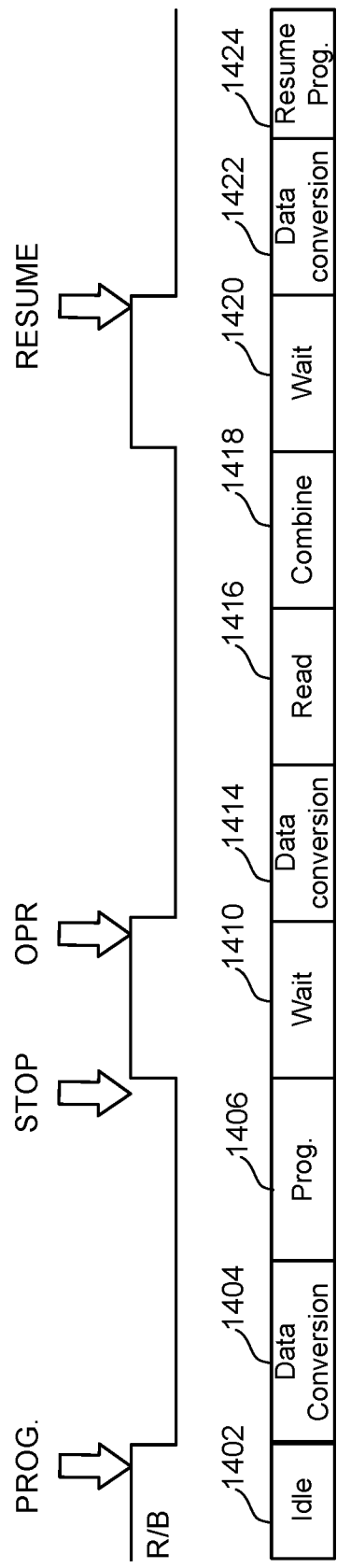
FIG. 14 shows an example of an OPR operation.

FIG. 14 illustrates an example of OPR showing a series of operations performed by a memory system (e.g., by one or more control circuits of a memory die and/or memory controller) and a corresponding ready/busy ("R/B") signal. Initially, the memory system is idle 1402 and R/B indicates that it is ready. When data is to be programmed ("PROG."), data is converted from state code to program code (data conversion 1404) and then programmed (Prog. 1406) in a series of PROG/PVFY iterations with a busy signal on R/B. When a "STOP" command is received, programming 1406 is stopped and the system waits 1410 for a subsequent command with a ready signal on R/B. When an OPR command is received, data conversion 1414 (from program code back to state code) is performed followed by a read 1416 of data in memory cells that were being programmed at programming step 1406. All logical pages being programmed may be converted at data conversion 1414 (not only the logical page or pages identified by the read command). Read 1416 may be limited to the logical page or pages identified in the read command. First partial data from read 1416 is combined with second partial data in latches from data conversion 1414 in a combining operation 1418. The combined data may be sent (e.g., to a memory controller in response to an appropriate command) and the system waits 1420 for a subsequent command with a ready signal on R/B. When a resume command ("RESUME") is received, data in latches is converted from state code back to program code (Data conversion 1422) and programming resumes (Resume Prog. 1424).

In some data storage systems, memory cells may be programmed at more than one speed using Quick Pass Write (QPW) to control programming speeds (e.g., to slow down programming of certain cells that are found to be nearing a target threshold voltage). In an example implementation of QPW, memory cells are verified at two verify voltage levels, a lower one referred to as VL and a higher one referred to as VH. The high verify voltage, VH, may used to determine when a memory cell has reached a target threshold voltage range (similar to VvA to VvG of FIG. 6) and memory cells that are verified at VH may be inhibited from further programming. The low verify voltage, VL, may be used to determine when a memory cell is nearing its target threshold voltage. Programming of memory cells that are found to have threshold voltages between VL and VH is slowed down to reduce the risk of over programming. This may result in threshold voltage distributions that are tighter (e.g., smaller standard deviations). A row of data latches may be used to maintain QPW data that indicates which programming speeds to apply to each memory cell (e.g., two or more programming speeds with one or more bit to indicate faster or slower programming). Where the number of data latches is sufficient, QPW data may be maintained in such a row of data latches and may be used when programming resumes (e.g., may remain latched from programming step 1406 until resume programming 1424). In some cases, the number of available rows of latches is limited and a row of data latches used for QPW during programming may be used during data conversion. While programming may resume without QPW, this may result in undesirable threshold voltage distributions (e.g., relatively wide distributions). Resumption of programming that includes QPW may be achieved efficiently in various ways including the examples of FIGS. 15A and 15B.

Figure 15A:
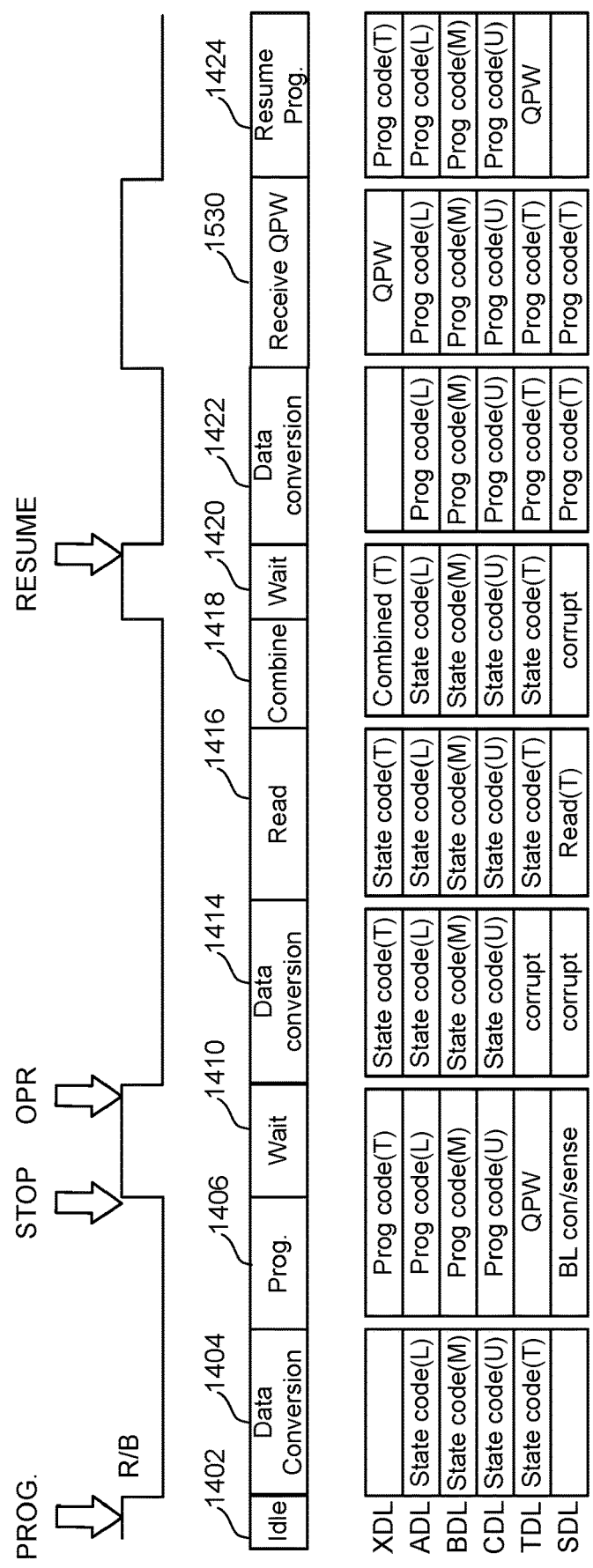
FIGS. 15A-B show examples of OPR operations with a resumed program operation using Quick Pass Write (QPW).

FIG. 15A shows a first example that includes a series of operations and corresponding ready/busy signal (similar to FIG. 14). In addition, FIG. 15A shows the contents of rows of data latches at different stages corresponding to different operation. Six rows of data latches are shown including a transfer data latch, XDL, four data latches, ADL, BDL, CDL and TDL, corresponding to four logical pages of data to be stored, and a sense data latch, SDL, that may be connected to a sense amplifier and may store sensed data. The rows of data latches shown may be implemented in sense block of a non-volatile memory die (e.g., sense blocks 350, for example as data latches 594 of sense block 500).

FIG. 15A shows the system is idle 1402 when a programming is initiated "PROG." Subsequently, data conversion 1404 converts state code for four logical pages, "State Code(L)," "State Code(M)," "State code(U)" and "State code(T)" in ADL, BDL, CDL and TDL respectively to program code, "Prog code(T)," "Prog code(L)," "Prog code (M)" and "Prog code(U)" in XDL, ADL, BDL and CDL respectively for programming step 1406. Note that even though the program code is identified by the same letters used to indicate logical pages of state data (L, M. U and T) there may not be a one-to-one correspondence between a page of state data and a unit of program code stored in a row of latches (e.g., State code(T) may not be calculated from two or more pages of program code and not from Prog code(T) alone). During programming step 1406, TDL is used to maintain QPW data related to programming speeds (e.g., indicating which memory cells should be subject to slower programming). SDL is used for bit line control and sensing "BL con/sense." During programming 1406, bits of program code are flipped when a corresponding memory cell reaches its target threshold voltage so that the latched data does not accurately reflect the data to be programmed once programming has begun. Data conversion 1414 converts program code back to state code. Because the program code is modified as programming proceeds, state code obtained from data conversion 1414 is also affected and does not reflect the logical pages to be programming. Conversion from program code to state code includes performing multiple logical operations on latched state code and requires additional rows of data latches (e.g., for output of logical operations performed on other rows). In the example of FIG. 15A, two additional rows of data latches (TDL and SDL) are required in addition to the four latches (XDL, ADL, BDL and CDL) that hold the logical pages of data. The result is that after conversion, data in TDL and SDL is corrupt and QPW data is not preserved in TDL.

In the example of FIG. 15A, read operation 1416 is directed to the top (T) logical page. Sense results "Read(T)" are latched into SDL and the state code for the top logical page "State code(T)" is generated in TDL. Because programming did not complete, the data "State code(T)" in TDL is only partial data (first partial data) for the top logical page. State code(T) that is latched in XDL represents second partial page data of the top logical page. In the combining operation 1418, first partial data from reading (latched in SDL) is combined with second partial data stored in latches (e.g., TDL or XDL) to generate combined state data for the top logical page "Combined(T)" in XDL. When the "RESUME" command is received, data conversion 1422 converts the state code, including "Combined(T)" back to program code as shown.

Subsequent to data conversion 1422 a "Receive QPW" step 1530 occurs. In this example, QPW data from program operation 1406 is stored elsewhere (e.g., in a memory controller chip) prior to data conversion 1414 and is returned after data conversion 1422. In some cases, QPW data is sent off-chip (e.g., to storage in a memory controller) in response to an OPR command and is returned with a RESUME command. In other examples, QPW data is automatically buffered to allow recovery. QPW data is initially transferred to transfer latch XDL and subsequently, for Resume Program operation 1424, latched data is rearranged in its original configuration, with QPW data in TDL. Thus, when programming resumes at step 1424, QPW is applied as previously in programming step 1406.

Figure 15B:
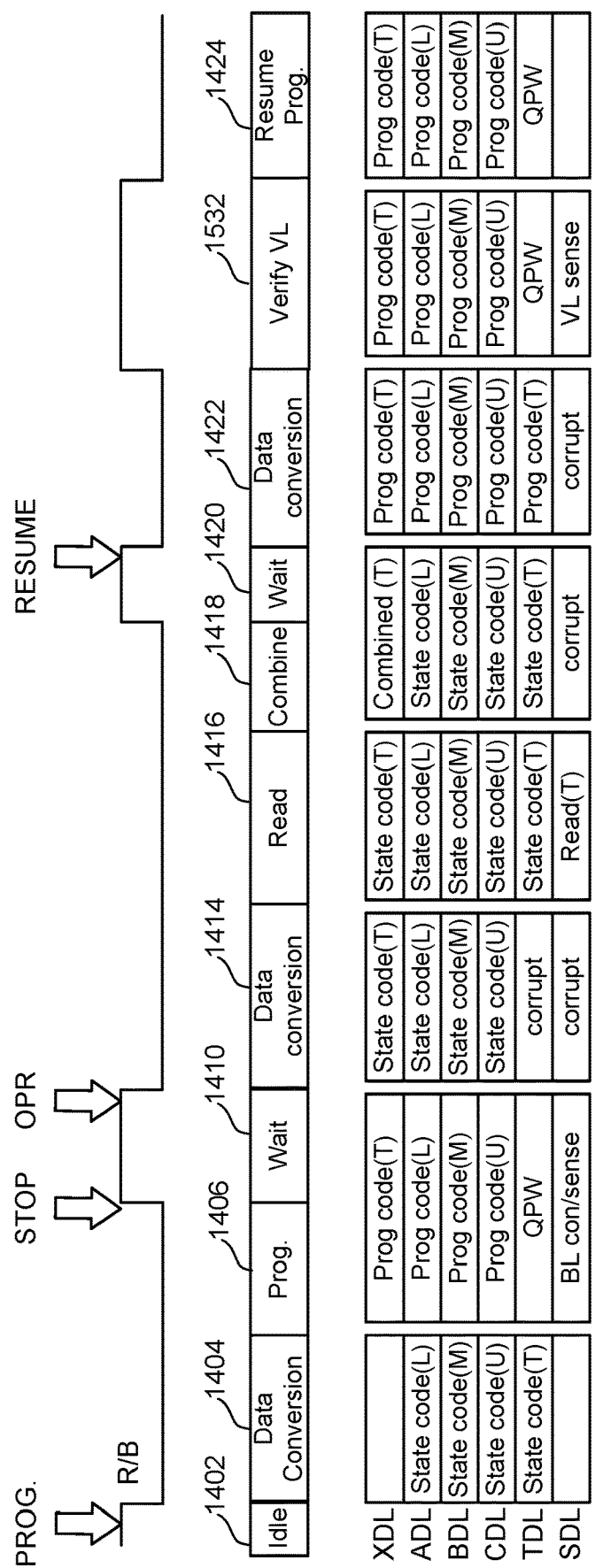

FIG. 15B shows an alternative implementation of OPW with QPW. In this case, QPW data is not received from elsewhere and is newly generated prior to resuming programming. Operations 1402 to 1422 may be similar to the example of FIG. 15A, with data conversion 1422 resulting in program code stored in latches as shown. Subsequently, during a "Verify VL" operation 1532, memory cells are sensed or verified using lower verify voltage, VL, to identify memory cells with threshold voltages between VL and VH (e.g., not yet fully programmed and within a window close to being programmed). QPW data is generated from this sensing and is stored in TDL (as during program step 1406). This allows the resume programming operation 1424 to proceed while implementing QPW as before using QPW data obtained from Verify VL operation 1532.

In non-volatile memories that use different threshold voltage ranges to represent different data states, bits may be mapped to data states in various ways. FIG. 9 showed one example of such a mapping of data states to bits of four logical pages of state code. In examples of the present technology, data may be converted from such a state code to program code for programming (and may be converted back to state code for OPR).

FIGS. 16A-B illustrate an example of a state code (FIG. 16A) and corresponding program code (FIG. 16B), which may be used in QLC memory. Other state and/or program codes may also be used for QLC. Similar state and/or program codes may be used for other memories including TLC and MLC memories.

FIG. 16A shows a unique state code four-bit combination assigned to each data state S0 to S15, with one bit from each of four logical pages. For example, ADL may contain lower page (L) data, BDL may store middle page (M) data, CDL may store upper page (U) data and TDL may store top (T) data in state code as shown in Data conversion 1404 of FIGS. 15A and 15B.

FIG. 16B shows a unique program code four-bit combination assigned to each data state S0 to S15. Such a program code may facilitate efficient programming. For example, the program code of FIG. 16B may allow certain latches to become available for other purposes during a program operation (e.g., XDL may be available after programming of data states S0-S7 because all remaining data states correspond to a logic 1 in XDL). In an example memory system, data is converted from a state code (e.g., state code of FIG. 16A) to a corresponding program code (e.g., program code of FIG. 16B) prior to programming to enable more efficient programming (e.g., data conversion 1404). This conversion may be performed by a series of logic operations, which may use additional latches (not shown in FIGS. 16A-B). The conversion from state code to program code may be reversed (e.g. for an OPW as illustrated in FIGS. 13, 14, and 15A-B) so that latched data that is in program code (e.g., as shown in FIG. 16B is converted to state code (e.g., as shown in FIG. 16A) prior to sending the state code in response to a read command (e.g., data conversion 1422). Conversion back to state code may be performed by a series of logic operations, which may use additional latches (not shown in FIGS. 16A-B).

While the examples of FIGS. 15A-B show the case where a single logical page is obtained (top logical page (T)) of four logical pages being programmed in a program operation, in other cases more than one logical page may be obtained in a similar manner (e.g., in response to a read command specifying more than one logical page of data that is being programmed).

Figure 17:
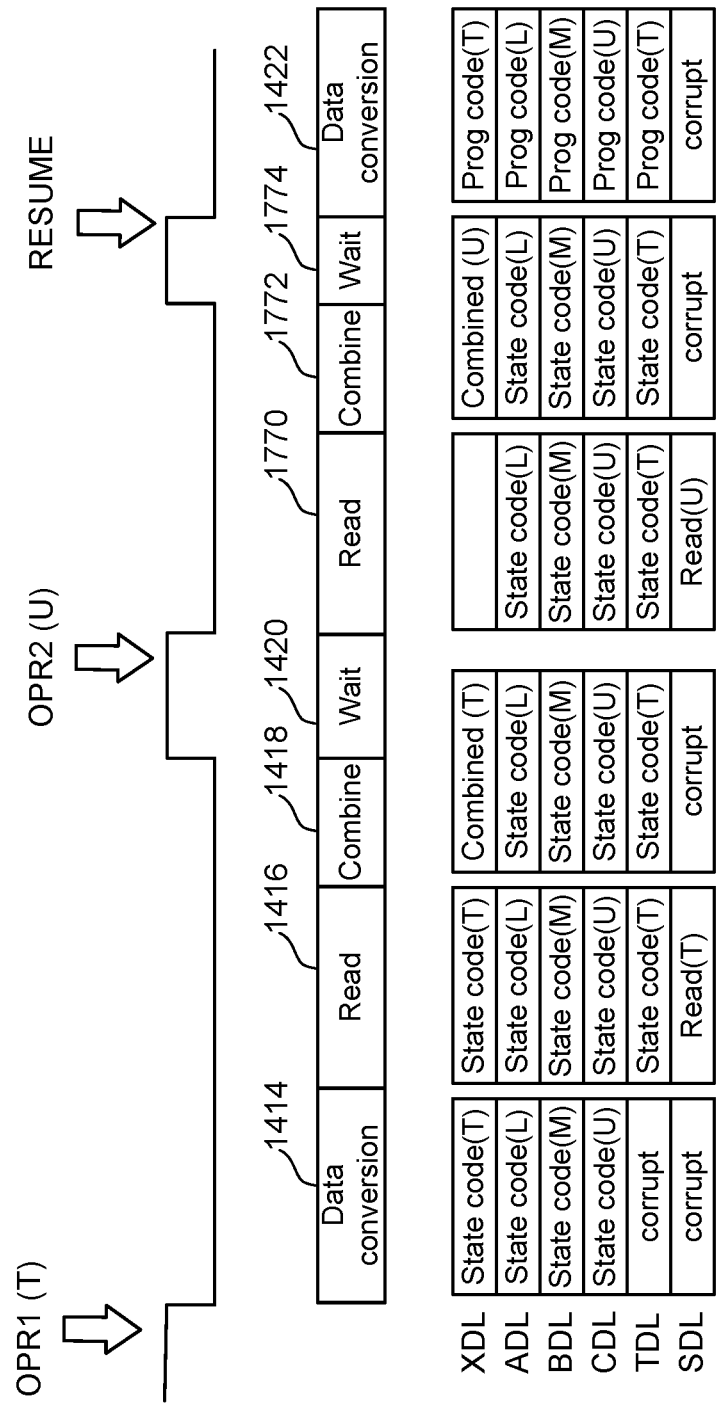
FIG. 17 shows an example of an OPR operation for two logical pages.

FIG. 17 illustrates an example in which two logical pages of data are read in an OPR operation. After programming is stopped and a first OPR command directed to the top logical page, "OPR1(T)," is received, data conversion operation 1414 converts data from program code to state code, read 1416 is performed and first and second partial data of logical page (T) are combined in combine operation 1418. (Operations prior to data conversion 1414 are omitted and may be implemented as previously illustrated). The top logical page generated by this combination may be returned in response to OPR1(T). During wait 1420, a second OPR command directed to the upper logical page, "OPR2(U)" is received. Because data is already in state code, no further conversion is required in response to OPR2(U) and a second read operation 1770 may be performed without waiting for conversion. Subsequently, first partial data from read operation 1770 is combined with second partial data from data conversion 1414 in combine operation 1772 to generate the upper logical page of data "Combined(U)" in XDL. This logical page of data may be returned in response to OPR2 (U). Subsequently, during wait 1774, a resume command, "RESUME," is received and data conversion 1442 is performed. Data conversion from program code to state code may be performed once for an OPR operation directed to multiple logical pages. Converted data may remain in state code until no more OPR reads remain (e.g., a RESUME command is received) and may then converted back to program code for resumed programming.

Figure 18:
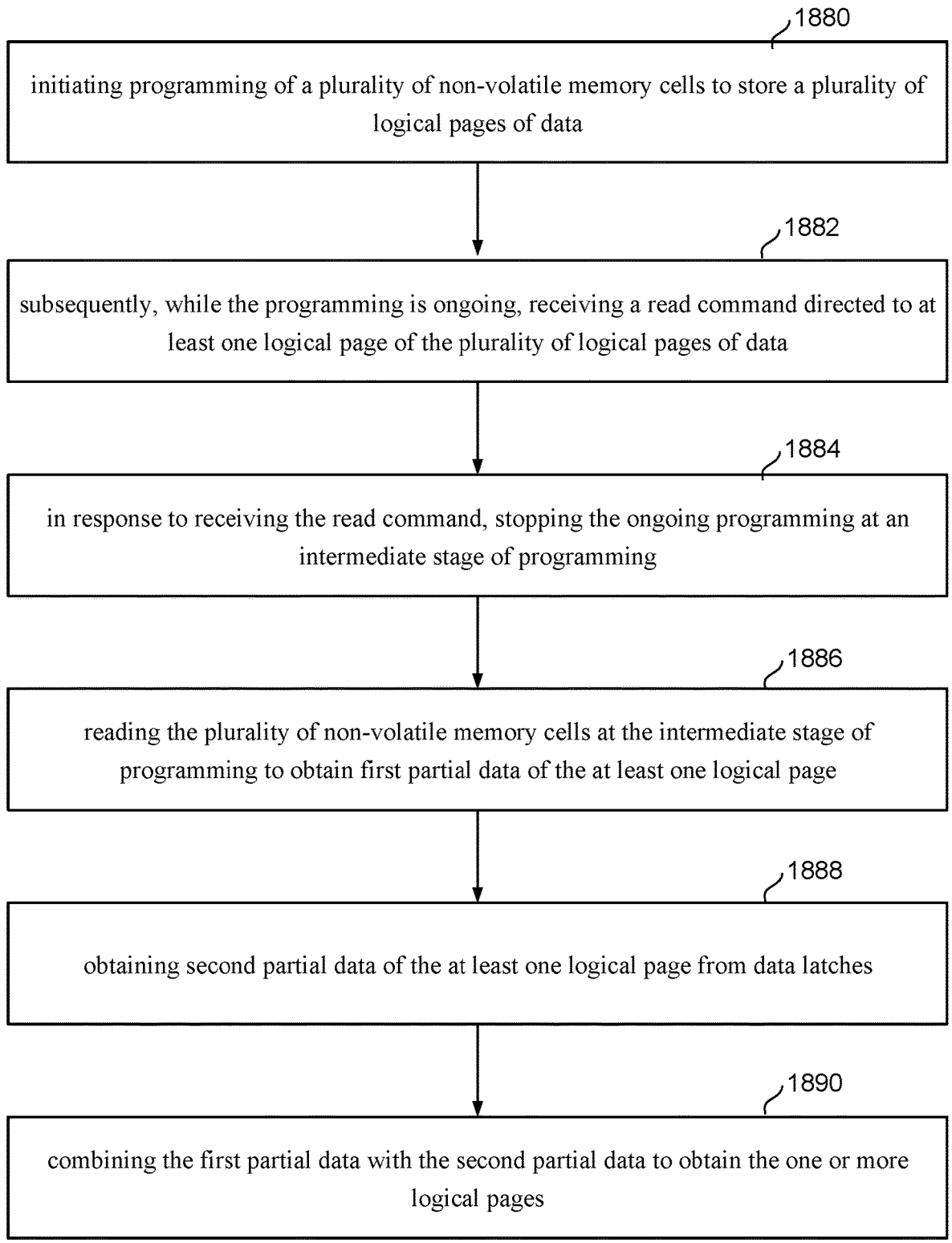
FIG. 18 shows an example of a method that includes combining partial data to obtain one or more logical pages.

FIG. 18 shows an example of a method that includes initiating programming of a plurality of non-volatile memory cells to store a plurality of logical pages of data 1880 and subsequently, while the programming is ongoing, receiving a read command directed to at least one logical page of the plurality of logical pages of data 1882 (e.g., while programming memory cells of a word line in memory structure 326, receiving a read command for at least one of the logical pages being programmed as illustrated in the examples of FIGS. 13-15B). The method further includes, in response to receiving the read command, stopping the ongoing programming at an intermediate stage of programming 1884, reading the plurality of non-volatile memory cells at the intermediate stage of programming to obtain first partial data of the at least one logical page 1886, obtaining second partial data of the at least one logical page from data latches 1888; and combining the first partial data with the second partial data to obtain the one or more logical pages 1890. The method illustrated in FIG. 18 and previously illustrated operations (e.g., operations of FIGS. 13-15B) may be implemented using memory cells of any suitable memory structure (e.g., memory structure 326) using any suitable data latches (e.g., data latches 594, which may include XDL, ADL, BDL, CDL, TDL and SDL as illustrated in the examples of FIGS. 15A-B and 17) and any suitable control circuits (e.g., one or more of read/write circuits 328, control circuits 310, system control logic 360 and controller 102).

While specific examples are described above, including specific encoding schemes associated with an example of MLC-fine programming, it will be understood that aspects of the present technology are not limited to such examples and may be extended to a wide variety of non-volatile memories using a variety of programming schemes and encoding schemes. Aspects of the present technology may be implemented using any suitable hardware. For example, control circuits 310 and/or read/write circuits 328 or system control logic 360 and/or column control circuitry 364 may perform steps described above and may be considered means for receiving a read command directed to at least one logical page of data during a program operation to store the at least one logical page of data in a plurality of non-volatile memory cells of a word line, stopping the program operation at an intermediate stage of programming, reading the plurality of non-volatile memory cells at the intermediate stage to obtain first partial data of the at least one logical page, and obtaining the at least one logical page of data by combining the first partial data with second partial data of the at least one logical page stored in data latches.

An example of an apparatus includes one or more control circuits configured to connect to a plurality of non-volatile memory cells. The one or more control circuits are configured to: receive a read command directed to at least one logical page of data during a program operation to store the at least one logical page of data in a plurality of non-volatile memory cells, stop the program operation at an intermediate stage of programming, read the plurality of non-volatile memory cells at the intermediate stage to obtain first partial data of at least one logical page and obtain the at least one logical page of data by combining the first partial data with second partial data of the at least one logical page stored in data latches.

Each of the plurality of non-volatile memory cells may be configured to store three or more bits of data and the plurality of non-volatile memory cells may be configured to store three or more logical pages of data in the program operation. The one or more control circuits may be configured to convert the at least one logical page of data from a state code to a program code in the program operation. The one or more control circuits may be configured to convert the second partial data stored in the data latches from the program code to the state code. The one or more control circuits may be configured to send combined first and second logical pages in state code in response to the read command. The one or more control circuits may be configured to read all logical pages of data of the program operation at the intermediate stage and identify partially programmed memory cells from a pattern of bits stored in the data latches corresponding to the partially programmed memory cells. The plurality of non-volatile memory cells may be configured to store four logical pages of data including a lower page, middle page, upper page and top page, with each non-volatile memory cell storing one bit from each of the four logical pages of data. The one or more control circuits may be further configured to resume the program operation to further program the plurality of non-volatile memory cells. The one or more control circuits may be further configured to resume the program operation using Quick Pass Write (QPW) data to provide two or more programming speeds, the QPW data stored at a storage location and transferred to the control circuits for the resumed program operation.

An example of a method includes initiating programming of a plurality of non-volatile memory cells to store a plurality of logical pages of data; subsequently, while the programming is ongoing, receiving a read command directed to at least one logical page of the plurality of logical pages of data; in response to receiving the read command, stopping the ongoing programming at an intermediate stage of programming; reading the plurality of non-volatile memory cells at the intermediate stage of programming to obtain first partial data of the at least one logical page; obtaining second partial data of the at least one logical page from data latches; and combining the first partial data with the second partial data to obtain the at least one logical page.

The method may further include sending the at least one logical page in response to the read command. The method may further include resuming programming of the plurality of non-volatile memory cells from the intermediate stage. The method may further include converting the plurality of logical pages of data from a state code to a program code prior to the programming. The method may further include converting the second partial data in the data latches from the program code to the state code. Combining the first partial data with the second partial data may include using first partial data from only non-volatile memory cells that have completed programming and using second partial data from the data latches for all other non-volatile memory cells. The method may further include sending Quick Pass Write (QPW) data to storage; subsequent to obtaining the at least one logical page, receiving the QPW data from storage; subsequently, resuming programming the plurality of non-volatile memory cells to store the plurality of logical pages of data; and using the QPW data from storage to control programming speeds of the plurality of non-volatile memory cells in the resumed programming. The method may further include subsequent to obtaining the at least one logical page, verifying data states of the plurality of non-volatile memory cells at a low verify voltage (VL) to obtain Quick Pass Write (QPW) data; subsequently resuming programming the plurality of non-volatile memory cells to store the plurality of logical pages of data; and using the QPW data from the verifying to control programming speeds of the plurality of non-volatile memory cells in the resumed programming.

An example of a data storage system includes a plurality of non-volatile memory cells coupled to a plurality of word lines; and means for receiving a read command directed to at least one logical page of data during a program operation to store the at least one logical page of data in a plurality of non-volatile memory cells of a word line, stopping the program operation at an intermediate stage of programming, reading the plurality of non-volatile memory cells at the intermediate stage to obtain first partial data of the at least one logical page, and obtaining the at least one logical page of data by combining the first partial data with second partial data of the at least one logical page stored in data latches.

Each non-volatile memory cell of the plurality of non-volatile memory cells may be configured to store at least four bits of data from four different logical pages in a Quad Level Cell (QLC) configuration.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. An apparatus comprising:
one or more control circuits configured to connect to a plurality of non-volatile memory cells,
the one or more control circuits are configured to:
convert at least one logical page of data from a state code to a program code in a program operation, receive a read command directed to the at least one logical page of data during the program operation to store the at least one logical page of data in a plurality of non-volatile memory cells, stop the program operation at an intermediate stage of programming, read the plurality of non-volatile memory cells at the intermediate stage to obtain first partial data of at least one logical page and obtain the at least one logical page of data by converting data stored in the data latches from the program code to the state code to obtain second partial data of the at least one logical page and combining the first partial data with the second partial data.

2. The apparatus of claim 1, wherein each of the plurality of non-volatile memory cells is configured to store three or more bits of data and the plurality of non-volatile memory cells are configured to store three or more logical pages of data in the program operation.

3. The apparatus of claim 1, wherein the one or more control circuits are located on a die and the plurality of memory cells are located on the die.

4. The apparatus of claim 1, wherein the one or more control circuits are located on a first die and the plurality of memory cells are located on a second die.

5. The apparatus of claim 4, wherein the one or more control circuits are configured to send combined first and second partial data in state code in response to the read command.

6. The apparatus of claim 1, wherein the one or more control circuits are configured to read all logical pages of data of the program operation at the intermediate stage and identify partially programmed memory cells from a pattern of bits stored in the data latches corresponding to the partially programmed memory cells.

7. The apparatus of claim 1, wherein the plurality of non-volatile memory cells are configured to store four logical pages of data including a lower page, middle page, upper page and top page, with each non-volatile memory cell storing one bit from each of the four logical pages of data.

8. The apparatus of claim 1, wherein the one or more control circuits are further configured to resume the program operation to further program the plurality of non-volatile memory cells.

9. The apparatus of claim 8, wherein the one or more control circuits are further configured to resume the program operation using Quick Pass Write (QPW) data to provide two or more programming speeds, the QPW data stored at a storage location and transferred to the control circuits for the resumed program operation.

10. The apparatus of claim 8, wherein the one or more control circuits are further configured to generate Quick Pass Write (QPW) data for the resumed program operation by performing a verify operation and to resume the program operation using the QPW data to provide two or more programming speeds.

11. A method comprising:
converting a plurality of logical pages of data from a state code to a program code;
subsequently, initiating programming of a plurality of non-volatile memory cells to store the plurality of logical pages of data;
subsequently, while the programming is ongoing, receiving a read command directed to at least one logical page of the plurality of logical pages of data;
in response to receiving the read command, stopping the ongoing programming at an intermediate stage of programming;
reading the plurality of non-volatile memory cells at the intermediate stage of programming to obtain first partial data of the at least one logical page;
obtaining second partial data of the at least one logical page by converting data in the data latches from the program code to the state code; and
combining the first partial data with the second partial data to obtain the at least one logical page.

12. The method of claim 11, further comprising sending the at least one logical page in response to the read command.

13. The method of claim 11, further comprising resuming programming of the plurality of non-volatile memory cells from the intermediate stage.

14. The method of claim 13, further comprising resuming the program operation using Quick Pass Write (QPW) data to provide two or more programming speeds.

15. The method of claim 14, further comprising sending the QPW data from a storage location to the control circuits for the resumed program operation.

16. The method of claim 15, wherein combining the first partial data with the second partial data includes using first partial data from only non-volatile memory cells that have completed programming and using second partial data from the data latches for all other non-volatile memory cells.

17. The method of claim 11, further comprising:
sending Quick Pass Write (QPW) data to storage in response to the read command;
subsequent to obtaining the at least one logical page, receiving the QPW data from storage;
subsequently, resuming programming the plurality of non-volatile memory cells to store the plurality of logical pages of data; and
using the QPW data from storage to control programming speeds of the plurality of non-volatile memory cells in the resumed programming.

18. The method of claim 11, further comprising:
subsequent to obtaining the at least one logical page, verifying data states of the plurality of non-volatile memory cells at a low verify voltage (VL) to obtain Quick Pass Write (QPW) data;
subsequently resuming programming the plurality of non-volatile memory cells to store the plurality of logical pages of data; and
using the QPW data from the verifying to control programming speeds of the plurality of non-volatile memory cells in the resumed programming.

19. A data storage system comprising:
a plurality of non-volatile memory cells coupled to a plurality of word lines; and
means for receiving a read command directed to at least one logical page of data during a program operation to store the at least one logical page of data in a plurality of non-volatile memory cells of a word line, stopping the program operation at an intermediate stage of programming, reading the plurality of non-volatile memory cells at the intermediate stage to obtain first partial data of the at least one logical page, obtaining the at least one logical page of data by combining the first partial data with second partial data of the at least one logical page stored in data latches and resuming the program operation to further program the plurality of non-volatile memory cells using Quick Pass Write (QPW) data to provide two or more programming speeds, the QPW data stored at a storage location and transferred from the storage location for the resumed program operation.

20. The data storage system of claim 19, wherein each non-volatile memory cell of the plurality of non-volatile memory cells is configured to store at least four bits of data from four different logical pages in a Quad Level Cell (QLC) configuration.

* * * * *